United States Patent
Geerling et al.

(10) Patent No.: US 10,649,945 B1
(45) Date of Patent: May 12, 2020

(54) NON-NATIVE DIGITAL INTERFACE SUPPORT OVER A TWO-WIRE COMMUNICATION BUS

(71) Applicant: ANALOG DEVICES INTERNATIONAL UNLIMITED COMPANY, Limerick (IE)

(72) Inventors: Philip Gregory Geerling, Saint Louis, MO (US); Eric Zolner, Brighton, MI (US); Martin Kessler, Norwood, MA (US); Peter Sealey, Cravens Arms (GB)

(73) Assignee: ANALOG DEVICES INTERNATIONAL UNLIMITED COMPANY, Limerick (IE)

(*) Notice: Subject to any disclaimer, the term of this patent is extended or adjusted under 35 U.S.C. 154(b) by 0 days.

(21) Appl. No.: 16/215,566

(22) Filed: Dec. 10, 2018

(51) Int. Cl.
*G06F 13/40* (2006.01)

(52) U.S. Cl.
CPC ...... *G06F 13/4068* (2013.01); *G06F 2213/40* (2013.01)

(58) Field of Classification Search
CPC combination set(s) only.
See application file for complete search history.

(56) References Cited

U.S. PATENT DOCUMENTS

| | | | |
|---|---|---|---|
| 5,819,051 A | 10/1998 | Murray et al. | |
| 7,158,596 B2 | 1/2007 | Knapp et al. | |
| 7,272,202 B2 | 9/2007 | Knapp et al. | |
| 7,315,551 B2 | 1/2008 | Olson et al. | |
| 7,395,362 B2 | 7/2008 | Drexler et al. | |
| 7,539,804 B2 | 5/2009 | Miura | |
| 7,590,790 B2 * | 9/2009 | Wang ........ | G06F 13/387 710/105 |
| 7,685,449 B2 | 3/2010 | Terasawa | |
| 7,707,437 B2 | 4/2010 | Berenbaum et al. | |
| 7,802,036 B2 | 9/2010 | Takeuchi | |
| 7,966,379 B2 | 6/2011 | Berenbaum et al. | |
| 8,147,338 B2 | 4/2012 | Hutchison-Kay | |
| 8,156,274 B2 | 4/2012 | Kapelner | |
| 8,185,759 B1 | 5/2012 | Li et al. | |
| 8,600,583 B2 | 12/2013 | Fervel et al. | |
| 8,615,091 B2 | 12/2013 | Terwal | |
| 8,667,194 B2 | 3/2014 | Dybsetter et al. | |
| 8,745,305 B2 | 6/2014 | Toba et al. | |
| 8,806,083 B2 | 8/2014 | Doorenbos | |

(Continued)

OTHER PUBLICATIONS

Unpublished U.S. Appl. No. 15/943,341, filed Apr. 2, 2018.

*Primary Examiner* — Raymond N Phan
(74) *Attorney, Agent, or Firm* — Patent Capital Group

(57) ABSTRACT

Disclosed herein are systems and techniques for digital interfaces over a two-wire communication bus. For example, an electronic device to interface between a two-wire communication bus and a non-native digital interface may include: a digital interface to support a first digital interface protocol; and a transceiver, coupled to the digital interface, to couple to a link of the two-wire communication bus and to receive data via the link, wherein the data includes commands in accordance with a second digital interface protocol different from the first digital interface protocol; wherein the digital interface is to transmit the commands to a peripheral device in accordance with the second digital interface protocol.

20 Claims, 16 Drawing Sheets

(56) References Cited

U.S. PATENT DOCUMENTS

| | | |
|---|---|---|
| 8,873,659 B2 | 10/2014 | Wang et al. |
| 8,987,933 B2 | 3/2015 | Yu |
| 2005/0120150 A1* | 6/2005 | Lissel ................... G06F 3/0607 710/33 |
| 2006/0227798 A1* | 10/2006 | Hou ..................... G06F 13/385 370/419 |
| 2007/0016702 A1* | 1/2007 | Pione ..................... G06F 3/061 710/62 |
| 2012/0093342 A1 | 4/2012 | Rupprecht et al. |
| 2012/0137027 A1* | 5/2012 | Zheng ................ G06F 11/3041 710/19 |
| 2013/0124763 A1 | 5/2013 | Kessler |
| 2014/0025999 A1 | 1/2014 | Kessler |
| 2014/0075061 A1* | 3/2014 | Fritchman ............. G06F 1/1632 710/62 |
| 2014/0095750 A1 | 4/2014 | Tailliet |
| 2014/0101351 A1 | 4/2014 | Hooper et al. |
| 2014/0101477 A1 | 4/2014 | Patterson |
| 2014/0223054 A1 | 8/2014 | Hasan et al. |
| 2014/0281077 A1 | 9/2014 | Biskup |
| 2014/0281078 A1 | 9/2014 | Biskup |
| 2014/0281079 A1 | 9/2014 | Biskup |
| 2014/0362865 A1 | 12/2014 | Chini et al. |
| 2015/0008960 A1 | 1/2015 | Lahr |
| 2015/0009050 A1 | 1/2015 | Lahr et al. |
| 2015/0032599 A1 | 1/2015 | Agapitov |
| 2015/0067206 A1* | 3/2015 | Luo ..................... G06F 13/4282 710/105 |
| 2015/0100716 A1* | 4/2015 | Rencs ................... G06F 13/385 710/308 |
| 2015/0301968 A1 | 10/2015 | Kessler |
| 2015/0331830 A1* | 11/2015 | Kumar ................ G06F 13/4282 710/11 |
| 2015/0365754 A1 | 12/2015 | Perl |
| 2015/0378959 A1* | 12/2015 | Jones ................ G06F 13/4291 714/5.11 |
| 2016/0034416 A1 | 2/2016 | Chavez et al. |
| 2016/0034417 A1 | 2/2016 | Chavez et al. |
| 2016/0041941 A1 | 2/2016 | Kessler et al. |
| 2016/0196817 A1 | 7/2016 | Mortensen et al. |
| 2016/0378153 A1* | 12/2016 | Kelly ..................... G06F 1/266 710/313 |
| 2017/0220502 A1 | 8/2017 | Kessler et al. |
| 2017/0222790 A1 | 8/2017 | Hooper et al. |
| 2017/0222829 A1 | 8/2017 | Kessler |
| 2017/0308352 A1 | 10/2017 | Kessler |
| 2018/0060269 A1 | 3/2018 | Kessler |

* cited by examiner

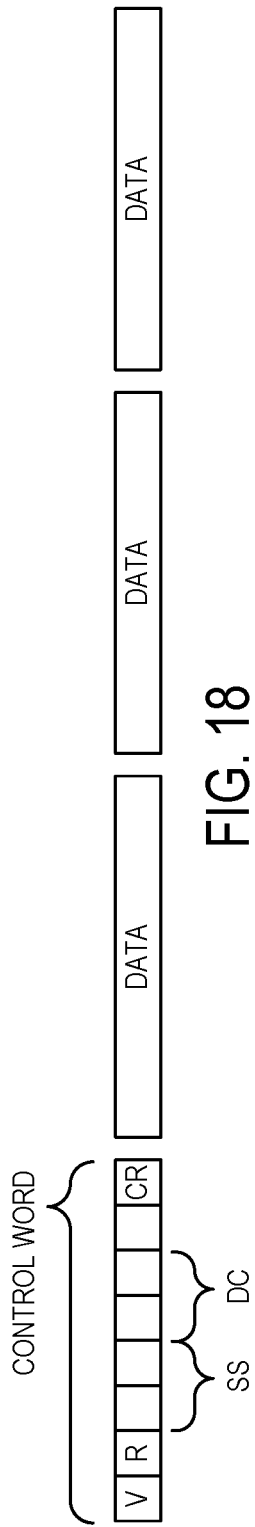

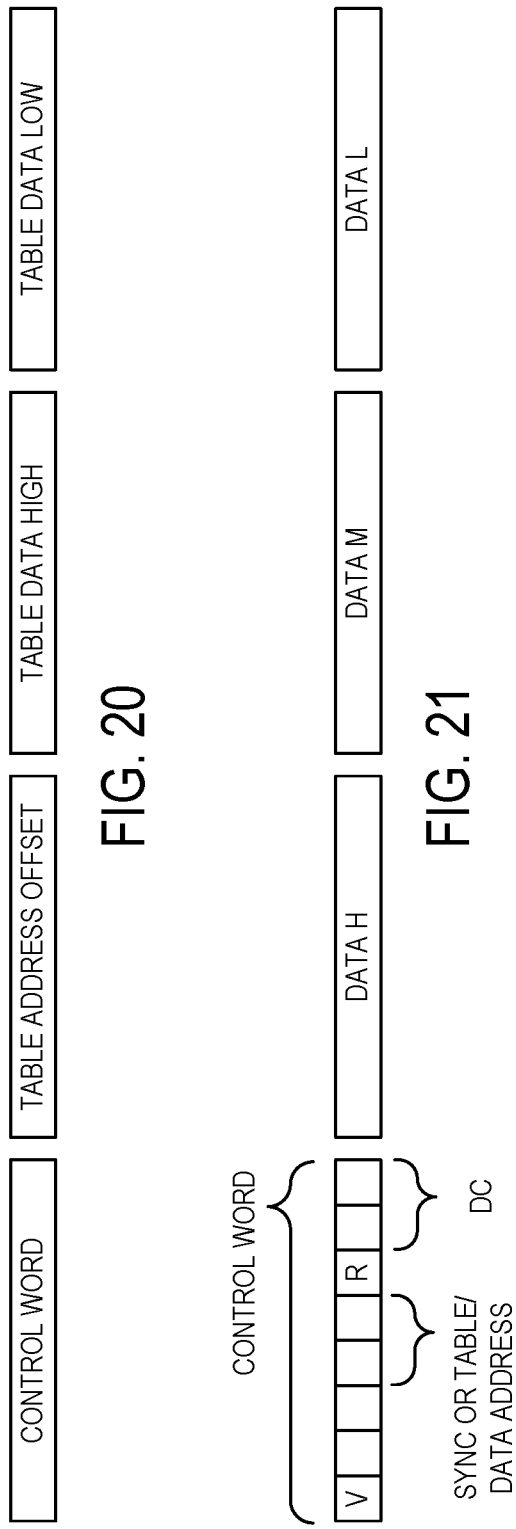

NON-NATIVE DIGITAL INTERFACE SUPPORT OVER A TWO-WIRE COMMUNICATION BUS

BACKGROUND

As electronic components decrease in size, and as performance expectations increase, more components are included in previously un-instrumented or less-instrumented devices. In some settings, the communication infrastructure used to exchange signals between these components (e.g., in a vehicle) has required thick and heavy bundles of cables.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, not by way of limitation, in the figures of the accompanying drawings.

FIGS. 18-21 are diagrams of example communications that may take place in the arrangement of FIG. 17, in accordance with various embodiments.

DETAILED DESCRIPTION

Figure 1:
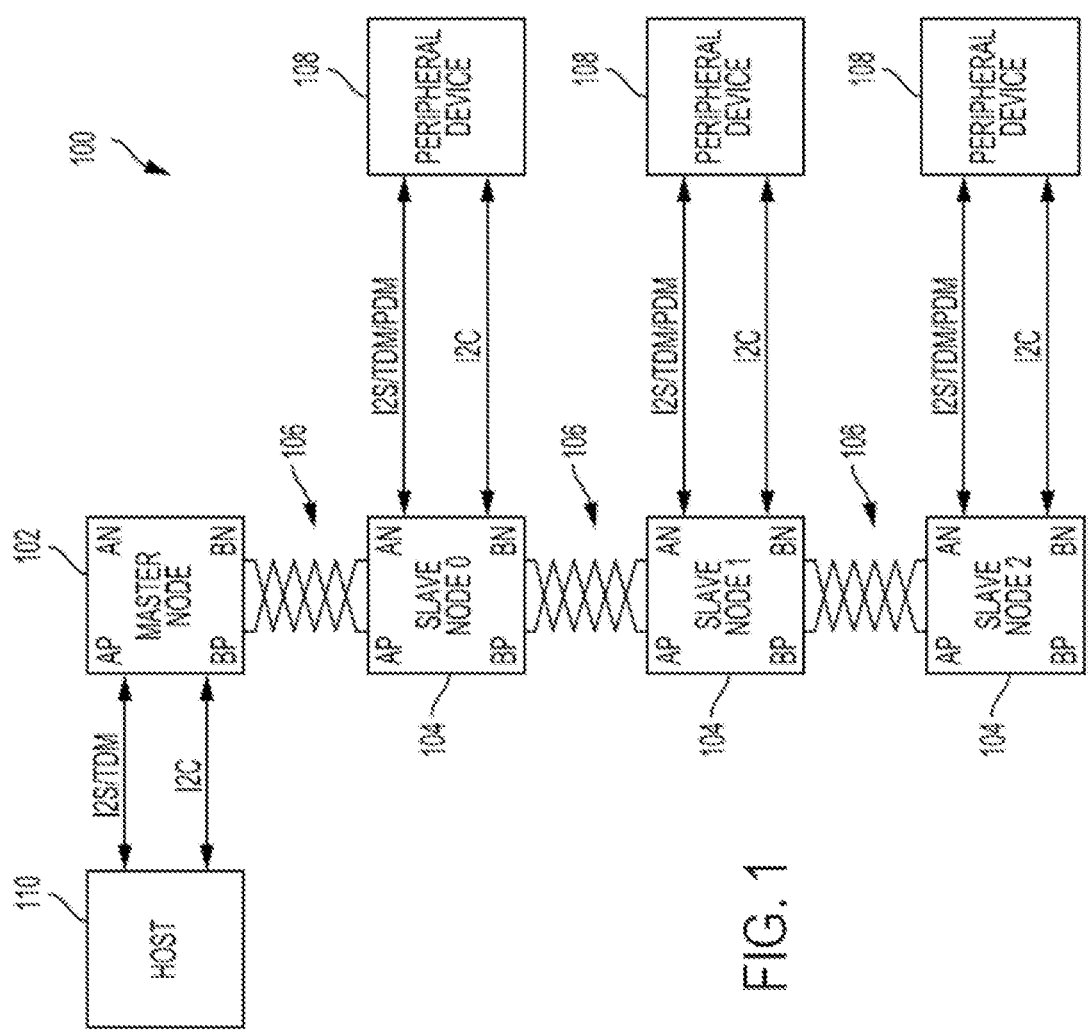
FIG. 1 is a block diagram of an illustrative two-wire communication system, in accordance with various embodiments.

Disclosed herein are systems and methods for providing digital interfaces over a two-wire communication bus. The systems and methods disclosed herein may be used to interface nodes of the two-wire communication systems disclosed herein with external devices in accordance with various industry-standard digital interfaces, such as Serial Peripheral Interface (SPI), Controller Area Network (CAN), Universal Asynchronous Receiver Transmitter (UART), Musical Instrument Digital Interface (MIDI), and/or others. Data for these external devices may be transmitted between nodes over the two-wire communication buses disclosed herein, and then transmitted out to the external devices from a node in accordance with the digital interface.

In the following detailed description, reference is made to the accompanying drawings which form a part hereof wherein like numerals designate like parts throughout, and in which is shown by way of illustration embodiments that may be practiced. It is to be understood that other embodiments may be utilized, and structural or logical changes may be made, without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

Various components may be referred to or illustrated herein in the singular (e.g., a "processor," a "peripheral device," etc.), but this is simply for ease of discussion, and any element referred to in the singular may include multiple such elements in accordance with the teachings herein.

The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous. As used herein, the term "circuitry" may refer to, be part of, or include an application-specific integrated circuit (ASIC), an electronic circuit, and optical circuit, a processor (shared, dedicated, or group), and/or memory (shared, dedicated, or group) that execute one or more software or firmware programs, a combinational logic circuit, and/or other suitable hardware that provide the described functionality. A master node may also be referred to as a master "device" herein; similarly, a slave node may be referred to as a slave "device" herein. As used herein, a "unipolar device" may be one that allows current to flow substantially freely in one direction, but highly impedes current flow in the opposite direction.

FIG. 1 is a block diagram of an illustrative half-duplex two-wire communication system 100, in accordance with various embodiments. The system 100 includes a host 110, a master node 102 and at least one slave node 104. In FIG. 1, three slave nodes (0, 1, and 2) are illustrated. The depiction of three slave nodes 104 in FIG. 1 is simply illustrative, and the system 100 may include one, two, or more slave nodes 104, as desired.

The master node 102 may communicate with the slave nodes 104 over a two-wire bus 106. The bus 106 may include different two-wire bus links between adjacent nodes along the bus 106 to connect the nodes along the bus 106 in a daisy-chain fashion. For example, as illustrated in FIG. 1, the bus 106 may include a link coupling the master node 102 to the slave node 0, a link coupling the slave node 0 to the slave node 1, and a link coupling the slave node 1 to the slave node 2. In some embodiments, the links of the bus 106 may each be formed of a single twisted wire pair (e.g., an unshielded twisted pair). In some embodiments, the links of the bus 106 may each be formed of a coax cable (e.g., with the core providing the "positive" line and the shield providing the "negative" line, or vice versa). The two-wire bus links together provide a complete electrical path (e.g., a forward and a return current path) so that no additional ground or voltage source lines need be used.

The host 110 may include a processor that programs the master node 102, and acts as the originator and recipient of various payloads transmitted along the bus 106. In particular, the host 110 may be the master of Inter-Integrated Circuit Sound (I2S) communications that happen along the bus 106. The host 110 may communicate with the master node 102 via an I2S/Time Division Multiplex (TDM) bus and/or an Inter-Integrated Circuit (I2C) bus. In some embodiments, the master node 102 may be a transceiver (e.g., the node transceiver 120 discussed below with reference to FIG. 2) located within a housing of the host 110. The master node 102 may be programmable by the host 110 over the I2C bus for configuration and read-back, and may be configured to generate clock, synchronization, and framing for all the slave nodes 104. In some embodiments, an extension of the I2C control bus between the host 110 in the master node 102 may be embedded in the data streams transmitted over the bus 106, allowing the host 110 direct access to registers and status information for the one or more slave nodes 104, as well as enabling I2C-to-I2C communication over distance to allow the host 110 to control the peripheral devices 108. In embodiments in which the system 100 is included in a vehicle, the host 110 and/or the master node 102 may be included in a head unit of the vehicle.

The master node 102 may generate "downstream" signals (e.g., data signals, power signals, etc., transmitted away from the master node 102 along the bus 106) and receive "upstream" signals (e.g., transmitted toward the master node 102 along the bus 106). The master node 102 may provide a clock signal for synchronous data transmission over the bus 106. As used herein, "synchronous data" may include data streamed continuously (e.g., audio signals) with a fixed time interval between two successive transmissions to/from the same node along the bus 106. In some embodiments, the clock signal provided by the master node 102 may be derived from an I2S input provided to the master node 102 by the host 110. A slave node 104 may be an addressable network connection point that represents a possible destination for data frames transmitted downstream on the bus 106 or upstream on the bus 106. A slave node 104 may also represent a possible source of downstream or upstream data frames. The system 100 may allow for control information and other data to be transmitted in both directions over the bus 106 from one node to the next. One or more of the slave nodes 104 may also be powered by signals transmitted over the bus 106, as discussed further below.

In particular, each of the master node 102 and the slave nodes 104 may include a positive upstream terminal (denoted as "AP"), a negative upstream terminal (denoted as "AN"), a positive downstream terminal (denoted as "BP"), and a negative downstream terminal (denoted as "BN"). The positive and negative downstream terminals of a node may be coupled to the positive and negative upstream terminals of the adjacent downstream node, respectively. As shown in FIG. 1, the master node 102 may include positive and negative upstream terminals, but these terminals may not be used; in other embodiments, the master node 102 may not include positive and negative upstream terminals. The last slave node 104 along the bus 106 (the slave node 2 in FIG. 1) may include positive and negative downstream terminals, but these terminals may not be used; in other embodiments, the last slave node 104 along the bus may not include positive and negative downstream terminals.

As discussed in detail below, the master node 102 may periodically send a synchronization control frame downstream, optionally along with data intended for one or more of the slave nodes 104. For example, the master node 102 may transmit a synchronization control frame every 1024 bits (representing a superframe) at a frequency of 48 kHz, resulting in an effective bit rate on the bus 106 of 49.152 Mbps. Other rates may be supported, including, for example, 44.1 kHz. The synchronization control frame may allow the slave nodes 104 to identify the beginning of each superframe and also, in combination with physical layer encoding/signaling, may allow each slave node 104 to derive its internal operational clock from the bus 106. The synchronization control frame may include a preamble for signaling the start of synchronization, as well as control fields that allow for various addressing modes (e.g., normal, broadcast, discovery), configuration information (e.g., writing to registers of the slave nodes 104), conveyance of I2C information, remote control of certain general-purpose input/output (GPIO) pins at the slave nodes 104, and other services. A portion of the synchronization control frame following the preamble and the payload data may be scrambled to reduce the likelihood that information in the synchronization control frame will be mistaken for a new preamble, and to flatten the spectrum of related electromagnetic emissions.

The synchronization control frame may get passed between slave node 104 (optionally along with other data, which may come from the master node 102 but additionally or alternatively may come from one or more upstream slave nodes 104 or from a slave node 104 itself) until it reaches the last slave node 104 (i.e., the slave node 2 in FIG. 1), which has been configured by the master node 102 as the last slave node 104 or has self-identified itself as the last slave node 104. Upon receiving the synchronization control frame, the last slave node 104 may transmit a synchronization response frame followed by any data that it is permitted to transmit (e.g., a 24-bit audio sample in a designated time slot). The synchronization response frame may be passed upstream between slave nodes 104 (optionally along with data from downstream slave nodes 104), and based on the synchronization response frame, each slave node 104 may be able to identify a time slot, if any, in which the slave node 104 is permitted to transmit.

In some embodiments, one or more of the slave nodes 104 in the system 100 may be coupled to and communicate with a peripheral device 108. For example, a slave node 104 may be configured to read data from and/or write data to the associated peripheral device 108 using I2S, pulse density modulation (PDM), TDM, and/or I2C protocols, as discussed below. Although the "peripheral device 108" may be referred to in the singular herein, this is simply for ease of discussion, and a single slave node 104 may be coupled with zero, one, or more peripheral devices. Examples of peripheral devices that may be included in the peripheral device 108 may include a digital signal processor (DSP), a field programmable gate array (FPGA), an ASIC, an analog to digital converter (ADC), a digital to analog converter (DAC), a codec, a microphone, a microphone array, a speaker, an audio amplifier, a protocol analyzer, an accelerometer or other motion sensor, an environmental condition sensor (e.g., a temperature, humidity, and/or gas sensor), a wired or wireless communication transceiver, a display device (e.g., a touchscreen display), a user interface component (e.g., a button, a dial, or other control), a camera (e.g., a video camera), a memory device, or any other suitable device that transmits and/or receives data. A number of examples of different peripheral device configurations are discussed in detail herein.

In some embodiments, the peripheral device 108 may include any device configured for I2S communication; the peripheral device 108 may communicate with the associated slave node 104 via the I2S protocol. In some embodiments, the peripheral device 108 may include any device configured for I2C communication; the peripheral device 108 may communicate with the associated slave node 104 via the I2C protocol. In some embodiments, a slave node 104 may not be coupled to any peripheral device 108.

A slave node 104 and its associated peripheral device 108 may be contained in separate housings and coupled through a wired or wireless communication connection or may be contained in a common housing. For example, a speaker connected as a peripheral device 108 may be packaged with the hardware for an associated slave node 104 (e.g., the node transceiver 120 discussed below with reference to FIG. 2), such that the hardware for the associated slave node 104 is contained within a housing that includes other speaker components. The same may be true for any type of peripheral device 108.

As discussed above, the host 110 may communicate with and control the master node 102 using multi-channel I2S and I2C communication protocols. In particular, the host 110 may transmit data via I2S to a frame buffer (not illustrated) in the master node 102, and the master node 102 may read data from the frame buffer and transmit the data along the bus 106. Analogously, the master node 102 may store data received via the bus 106 in the frame buffer, and then may transmit the data to the host 110 via I2S.

Each slave node 104 may have internal control registers that may be configured by communications from the master node 102. A number of such registers are discussed in detail below. Each slave node 104 may receive downstream data and may retransmit the data further downstream. Each slave node 104 may receive and/or generate upstream data and/or retransmit data upstream and/or add data to and upstream transaction.

Communications along the bus 106 may occur in periodic superframes. Each superframe may begin with a downstream synchronization control frame; be divided into periods of downstream transmission (also called "downstream portions"), upstream transmission (also called "upstream portions"), and no transmission (where the bus 106 is not driven); and end just prior to transmission of another downstream synchronization control frame. The master node 102 may be programmed (by the host 110) with a number of downstream portions to transmit to one or more of the slave nodes 104 and a number of upstream portions to receive from one or more of the slave nodes 104. Each slave node 104 may be programmed (by the master node 102) with a number of downstream portions to retransmit down the bus 106, a number of downstream portions to consume, a number of upstream portions to retransmit up the bus 106, and a number of upstream portions in which the slave node 104 may transmit data received from the slave node 104 from the associated peripheral device 108. Communication along the bus 106 is discussed in further detail below with reference to FIGS. 2-12.

Figure 2:
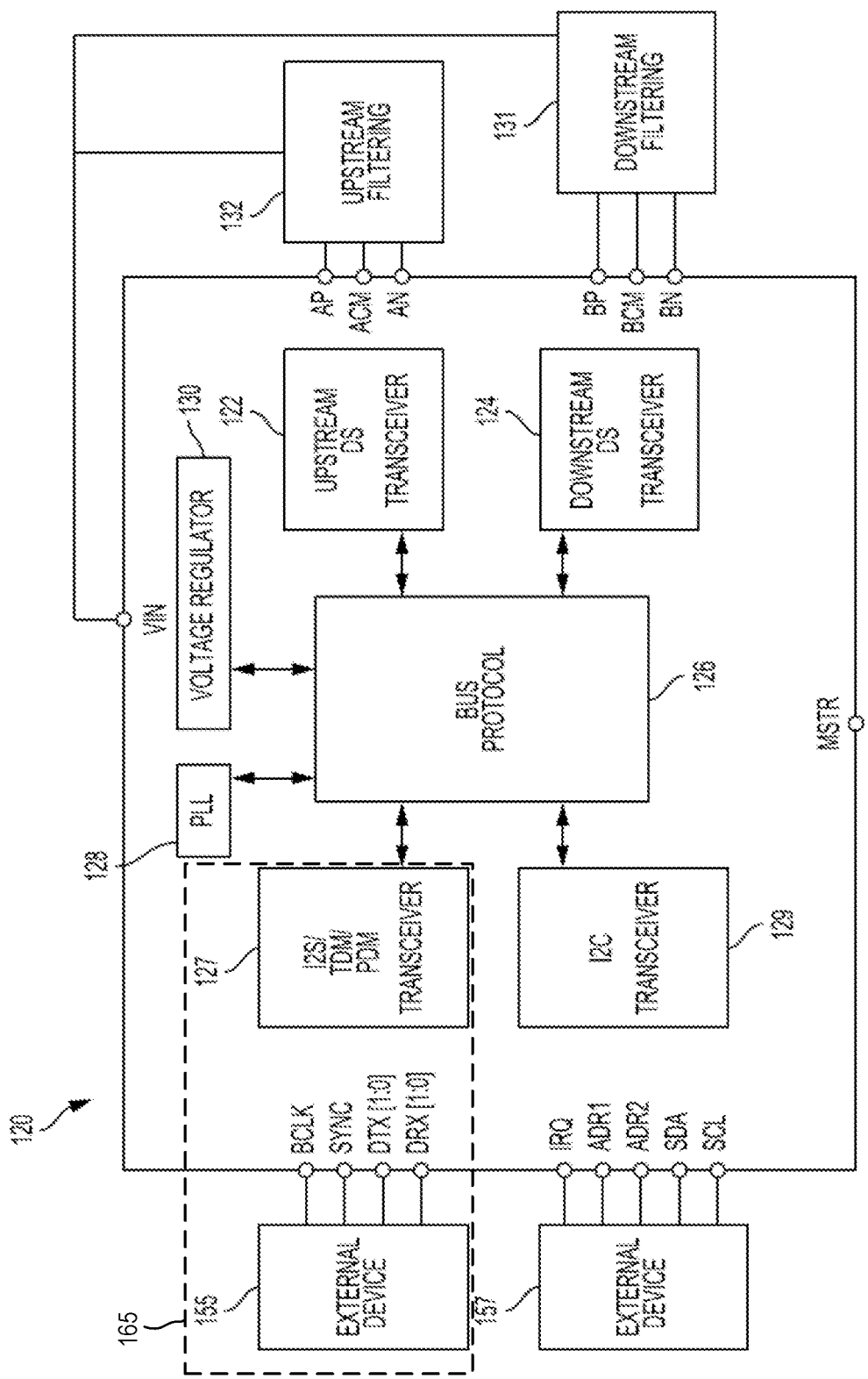
FIG. 2 is a block diagram of a node transceiver that may be included in a node of the system of FIG. 1, in accordance with various embodiments.

Each of the master node 102 and the slave nodes 104 may include a transceiver to manage communication between components of the system 100. FIG. 2 is a block diagram of a node transceiver 120 that may be included in a node (e.g., the master node 102 or a slave node 104) of the system 100 of FIG. 1, in accordance with various embodiments. In some embodiments, a node transceiver 120 may be included in each of the nodes of the system 100, and a control signal may be provided to the node transceiver 120 via a master (MSTR) pin to indicate whether the node transceiver 120 is to act as a master (e.g., when the MSTR pin is high) or a slave (e.g., when the MSTR pin is low).

The node transceiver 120 may include an upstream differential signaling (DS) transceiver 122 and a downstream DS transceiver 124. The upstream DS transceiver 122 may be coupled to the positive and negative upstream terminals discussed above with reference to FIG. 1, and the downstream DS transceiver 124 may be coupled to the positive and negative downstream terminals discussed above with reference to FIG. 1. In some embodiments, the upstream DS transceiver 122 may be a low voltage DS (LVDS) transceiver, and the downstream DS transceiver 124 may be an LVDS transceiver. Each node in the system 100 may be AC-coupled to the bus 106, and data signals may be conveyed along the bus 106 (e.g., via the upstream DS transceiver 122 and/or the downstream DS transceiver 124) using a predetermined form of DS (e.g., LVDS or Multipoint LVDS (MLVDS) or similar signaling) with appropriate encoding to provide timing information over the bus 106 (e.g., differential Manchester coding, biphase mark coding, Manchester coding, Non-Return-to-Zero, Inverted (NRZI) coding with run-length limiting, or any other suitable encoding).

The upstream DS transceiver 122 and the downstream DS transceiver 124 may communicate with bus protocol circuitry 126, and the bus protocol circuitry 126 may communicate with a phased locked loop (PLL) 128 and voltage regulator circuitry 130, among other components. When the node transceiver 120 is powered up, the voltage regulator circuitry 130 may raise a "power good" signal that is used by the PLL 128 as a power-on reset.

As noted above, one or more of the slave nodes 104 in the system 100 may receive power transmitted over the bus 106 concurrently with data. For power distribution (which is optional, as some of the slave nodes 104 may be configured to have exclusively local power provided to them), the master node 102 may place a DC bias on the bus link between the master node 102 and the slave node 0 (e.g., by connecting one of the downstream terminals to a voltage source provided by a voltage regulator and the other downstream terminal to ground). The DC bias may be a predetermined voltage, such as 5 V, 8 V, the voltage of a car battery, or a higher voltage. Each successive slave node 104 can selectively tap its upstream bus link to recover power (e.g., using the voltage regulator circuitry 130). This power may be used to power the slave node 104 itself (and optionally one or more peripheral device 108 coupled to the slave node 104). A slave node 104 may also selectively bias the bus link downstream for the next-in-line slave node 104 with either the recovered power from the upstream bus link or from a local power supply. For example, the slave node 0 may use the DC bias on the upstream bus link 106 to recover power for the slave node 0 itself and/or for one or more associated peripheral device 108, and/or the slave node 0 may recover power from its upstream bus link 106 to bias its downstream bus link 106.

Thus, in some embodiments, each node in the system 100 may provide power to the following downstream node over a downstream bus link. The powering of nodes may be performed in a sequenced manner. For example, after discovering and configuring the slave node 0 via the bus 106, the master node 102 may instruct the slave node 0 to provide power to its downstream bus link 106 to provide power to the slave node 1; after the slave node 1 is discovered and configured, the master node 102 may instruct the slave node 1 to provide power to its downstream bus link 106 in order to provide power to the slave node 2 (and so on for additional slave nodes 104 coupled to the bus 106). In some embodiments, one or more of the slave nodes 104 may be locally powered, instead of or in addition to being powered from its upstream bus link. In some such embodiments, the local power source for a given slave node 104 may be used to provide power to one or more downstream slave nodes.

In some embodiments, upstream filtering circuitry 132 may be disposed between the upstream DS transceiver 122 and the voltage regulator circuitry 130, and downstream filtering circuitry 131 may be disposed between the downstream DS transceiver 124 and the voltage regulator circuitry 130. Since each link of the bus 106 may carry AC (signal) and DC (power) components, the upstream filtering circuitry 132 and the downstream filtering circuitry 131 may separate the AC and DC components, providing the AC components to the upstream DS transceiver 122 and the downstream DS transceiver 124, and providing the DC components to the voltage regulator circuitry 130. AC couplings on the line side of the upstream DS transceiver 122 and downstream DS transceiver 124 substantially isolate the transceivers 122 and 124 from the DC component on the line to allow for high speed bi-directional communications. As discussed above, the DC component may be tapped for power, and the upstream filtering circuitry 132 and the downstream filtering circuitry 131 may include a ferrite, a common mode choke, or an inductor, for example, to reduce the AC component provided to the voltage regulator circuitry 130. In some embodiments, the upstream filtering circuitry 132 may be included in the upstream DS transceiver 122, and/or the downstream filtering circuitry 131 may be included in the downstream DS transceiver 124; in other embodiments, the filtering circuitry may be external to the transceivers 122 and 124.

The node transceiver 120 may include a transceiver 127 for I2S, TDM, and PDM communication between the node transceiver 120 and an external device 155. Although the "external device 155" may be referred to in the singular herein, this is simply for ease of illustration, and multiple external devices may communicate with the node transceiver 120 via the I2S/TDM/PDM transceiver 127. As known in the art, the I2S protocol is for carrying pulse code modulated (PCM) information (e.g., between audio chips on a printed circuit board (PCB)). As used herein, "I2S/TDM" may refer to an extension of the I2S stereo (2-channel) content to multiple channels using TDM. As known in the art, PDM may be used in sigma delta converters, and in particular, PDM format may represent an over-sampled 1-bit sigma delta ADC signal before decimation. PDM format is often used as the output format for digital microphones. The I2S/TDM/PDM transceiver 127 may be in communication with the bus protocol circuitry 126 and pins for communication with the external device 155. Six pins, BCLK, SYNC, DTX[1:0], and DRX[1:0], are illustrated in FIG. 2; the BCLK pin may be used for an I2S bit clock, the SYNC pin may be used for an I2S frame synchronization signal, and the DTX[1:0] and DRX[1:0] pins are used for transmit and receive data channels, respectively. Although two transmit pins (DTX[1:0]) and two receive pins (DRX[1:0]) are illustrated in FIG. 2, any desired number of receive and/or transmit pins may be used. The I2S/TDM/PDM transceiver 127 (which may be referred to herein simply as "the transceiver 127"), the external device 155, and the connections therebetween may be referred to herein as a node transceiver/external device arrangement 165 (or simply "the arrangement 165"). A number of examples of arrangements 165, providing various digital interfaces between an I2S/TDM/PDM node transceiver 120 and an external device 155, are described herein.

When the node transceiver 120 is included in the master node 102, the external device 155 may include the host 110, and the I2S/TDM/PDM transceiver 127 may provide an I2S slave (regarding BCLK and SYNC) that can receive data from the host 110 and send data to the host 110 synchronously with an I2S interface clock of the host 110. In particular, an I2S frame synchronization signal may be received at the SYNC pin as an input from the host 110, and the PLL 128 may use that signal to generate clocks. When the node transceiver 120 is included in a slave node 104, the external device 155 may include one or more peripheral devices 108, and the I2S/TDM/PDM transceiver 127 may provide an I2S clock master (for BCLK and SYNC) that can control I2S communication with the peripheral device 108. In particular, the I2S/TDM/PDM transceiver 127 may provide an I2S frame synchronization signal at the SYNC pin as an output. Registers in the node transceiver 120 may determine which and how many I2S/TDM channels are being transmitted as data slots over the bus 106. A TDM mode (TDMMODE) register in the node transceiver 120 may store a value of how many TDM channels fit between consecutive SYNC pulses on a TDM transmit or receive pin. Together with knowledge of the channel size, the node transceiver 120 may automatically set the BCLK rate to match the number of bits within the sampling time (e.g., 48 kHz).

The node transceiver 120 may include a transceiver 129 for I2C communication between the node transceiver 120 and an external device 157. Although the "external device 157" may be referred to in the singular herein, this is simply for ease of illustration, and multiple external devices may communicate with the node transceiver 120 via the I2C transceiver 129. As known in the art, the I2C protocol uses clock (SCL) and data (SDA) lines to provide data transfer. The I2C transceiver 129 may be in communication with the bus protocol circuitry 126 and pins for communication with the external device 157. Four pins, ADR1, ADR2, SDA, and SCL are illustrated in FIG. 2; ADR1 and ADR2 may be used to modify the I2C addresses used by the node transceiver 120 when the node transceiver 120 acts as an I2C slave (e.g., when it is included in the master node 102), and SDA and SCL are used for the I2C serial data and serial clock signals, respectively. When the node transceiver 120 is included in the master node 102, the external device 157 may include the host 110, and the I2C transceiver 129 may provide an I2C slave that can receive programming instructions from the host 110. In particular, an I2C serial clock signal may be received at the SCL pin as an input from the host 110 for register accesses. When the node transceiver 120 is included in a slave node 104, the external device 157 may include a peripheral device 108 and the I2C transceiver 129 may provide an I2C master to allow the I2C transceiver to program one or more peripheral devices in accordance with instructions provided by the host 110 and transmitted to the node transceiver 120 via the bus 106. In particular, the I2C transceiver 129 may provide the I2C serial clock signal at the SCL pin as an output.

The node transceiver 120 may include an interrupt request (IRQ) pin in communication with the bus protocol circuitry 126. When the node transceiver 120 is included in the master node 102 via the I2C transceiver 129, the bus protocol circuitry 126 may provide event-driven interrupt requests toward the host 110 via the IRQ pin. When the node transceiver 120 is included in a slave node 104 (e.g., when the MSTR pin is low), the IRQ pin may serve as a GPIO pin with interrupt request capability.

The system 100 may operate in any of a number of different operational modes. The nodes on the bus 106 may each have a register indicating which operational mode is currently enabled. Descriptions follow of examples of various operational modes that may be implemented. In a standby operational mode, bus activity is reduced to enable global power savings; the only traffic required is a minimal downstream preamble to keep the Pas of each node (e.g., the PLL 128) synchronized. In standby operational mode, reads and writes across the bus 106 are not supported. In a discovery operational mode, the master node 102 may send predetermined signals out along the bus 106 and wait for suitable responses to map out the topology of slave nodes 104 distributed along the bus 106. In a normal operational mode, full register access may be available to and from the slave nodes 104 as well as access to and from peripheral devices 108 over the bus 106. Normal mode may be globally configured by the host 110 with or without synchronous upstream data and with or without synchronous downstream data.

Figure 3:
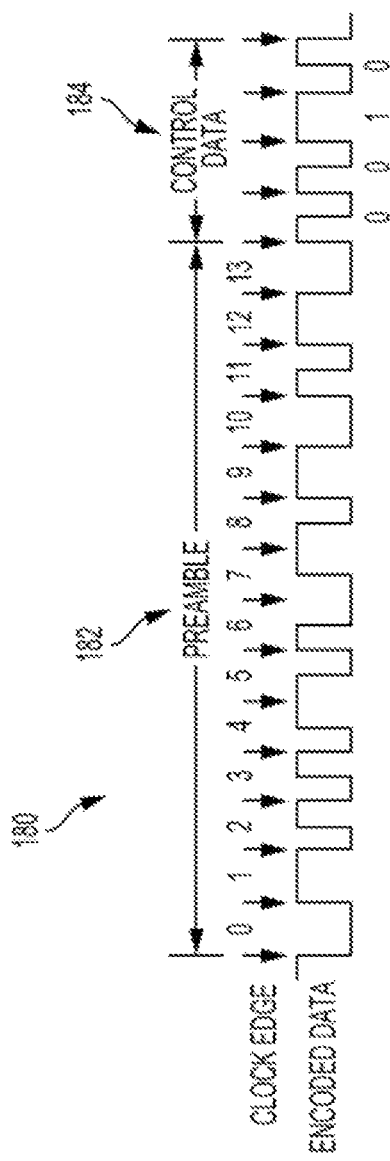
FIG. 3 is a diagram of a portion of a synchronization control frame used for communication in the system of FIG. 1, in accordance with various embodiments.

FIG. 3 is a diagram of a portion of a synchronization control frame 180 used for communication in the system 100, in accordance with various embodiments. In particular, the synchronization control frame 180 may be used for data clock recovery and PLL synchronization, as discussed below. As noted above, because communications over the bus 106 may occur in both directions, communications may be time-multiplexed into downstream portions and upstream portions. In a downstream portion, a synchronization control frame and downstream data may be transmitted from the master node 102, while in an upstream portion, a synchronization response frame, and upstream data may be transmitted to the master node 102 from each of the slave nodes 104. The synchronization control frame 180 may include a preamble 182 and control data 184. Each slave node 104 may be configured to use the preamble 182 of the received synchronization control frame 180 as a time base for feeding the PLL 128. To facilitate this, a preamble 182 does not follow the "rules" of valid control data 184, and thus can be readily distinguished from the control data 184.

Figure 5:
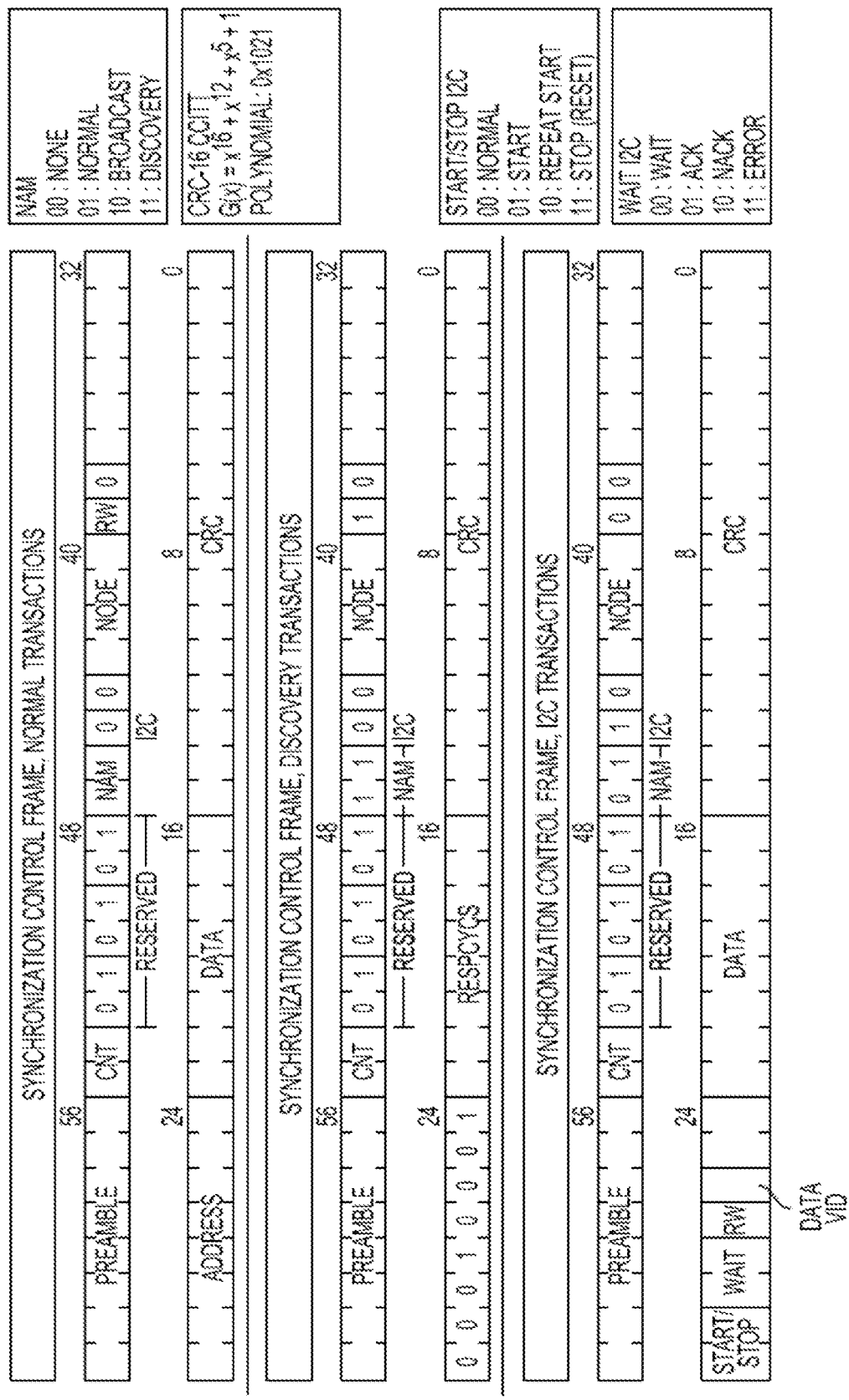
FIG. 5 illustrates example formats for a synchronization control frame in different modes of operation of the system of FIG. 1, in accordance with various embodiments.

For example, in some embodiments, communication along the bus 106 may be encoded using a clock first, transition on zero differential Manchester coding scheme. According to such an encoding scheme, each bit time begins with a clock transition. If the data value is zero, the encoded signal transitions again in the middle of the bit time. If the data value is one, the encoded signal does not transition again. The preamble 182 illustrated in FIG. 5 may violate the encoding protocol (e.g., by having clock transitions that do not occur at the beginning of bit times 5, 7, and 8), which means that the preamble 182 may not match any legal (e.g., correctly encoded) pattern for the control data 184. In addition, the preamble 182 cannot be reproduced by taking a legal pattern for the control data 184 and forcing the bus 106 high or low for a single bit time or for a multiple bit time period. The preamble 182 illustrated in FIG. 5 is simply illustrative, and the synchronization control frame 180 may include different preambles 182 that may violate the encoding used by the control data 184 in any suitable manner.

The bus protocol circuitry 126 may include differential Manchester decoder circuitry that runs on a clock recovered from the bus 106 and that detects the synchronization control frame 180 to send a frame sync indicator to the PLL 128. In this manner, the synchronization control frame 180 may be detected without using a system clock or a higher-speed oversampling clock. Consequently, the slave nodes 104 can receive a PLL synchronization signal from the bus 106 without requiring a crystal clock source at the slave nodes 104.

Figure 4:
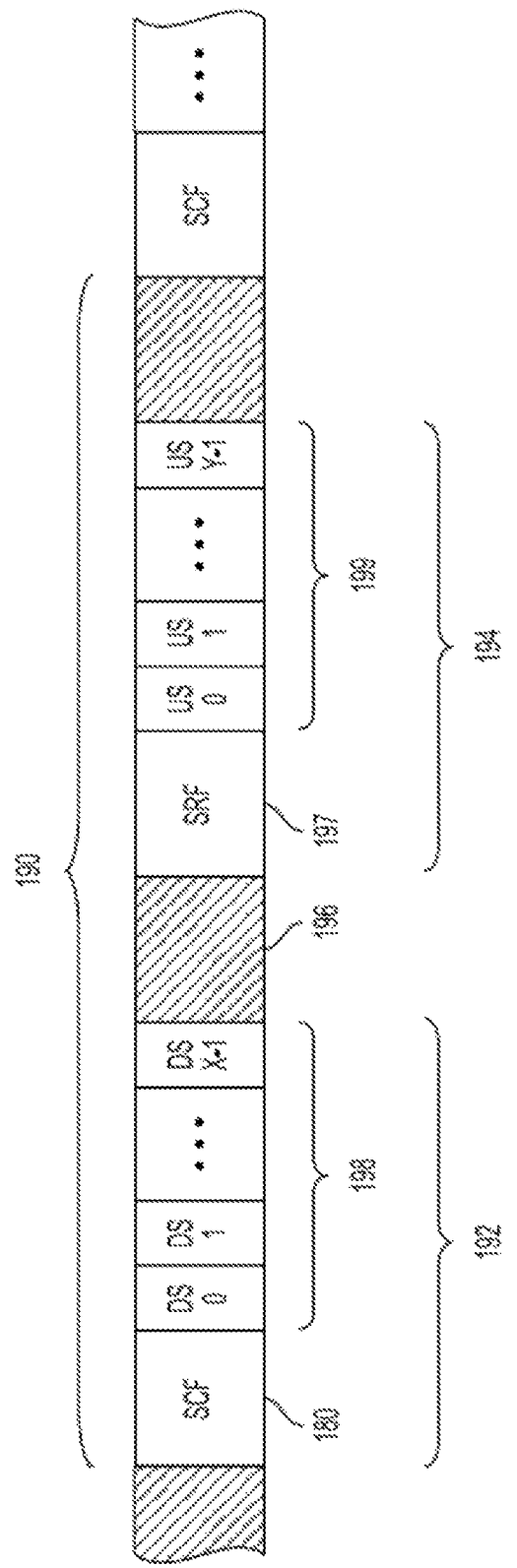
FIG. 4 is a diagram of a superframe used for communication in the system of FIG. 1, in accordance with various embodiments.
Figure 6:
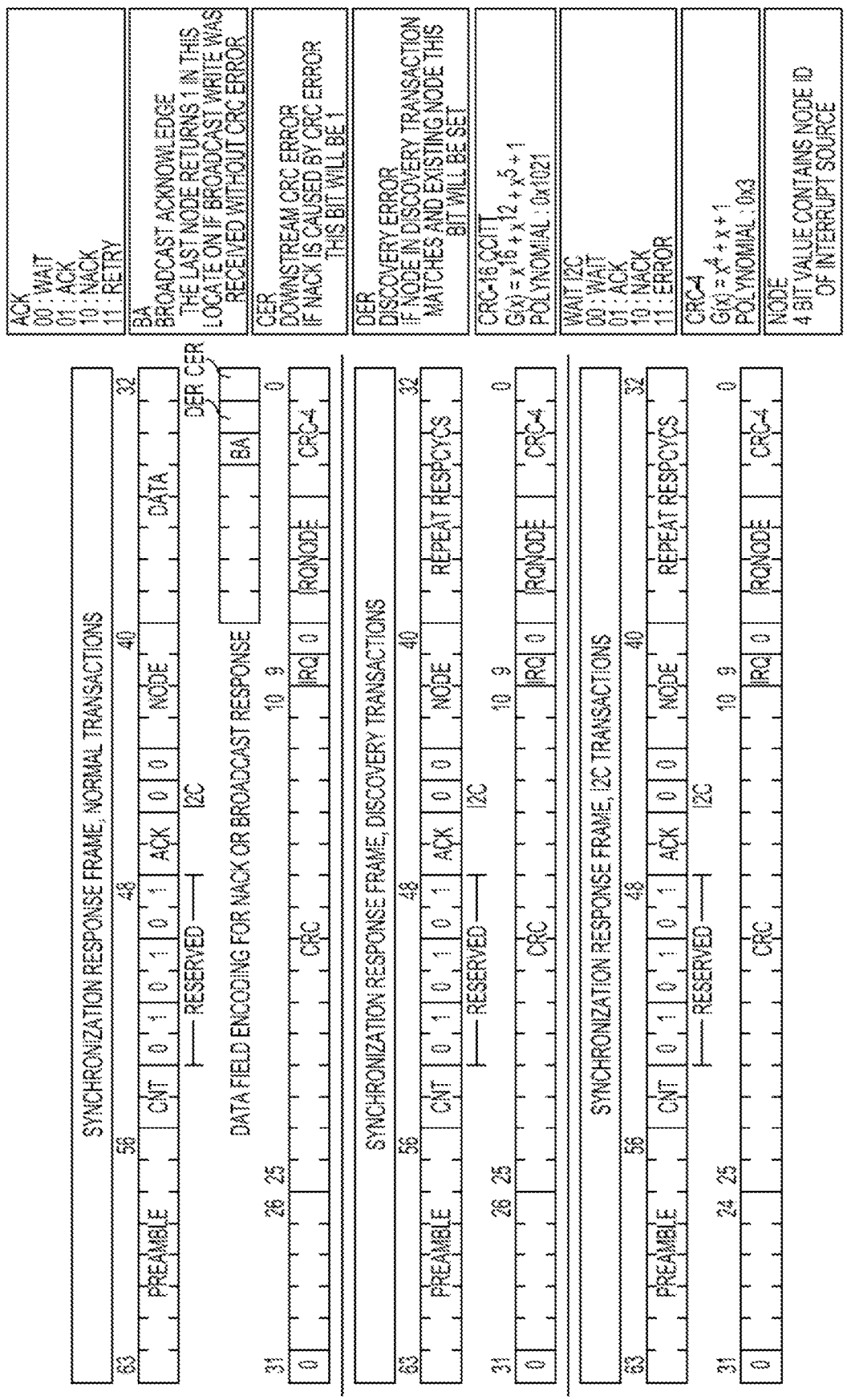
FIG. 6 illustrates example formats for a synchronization response frame at different modes of operation of the system of FIG. 1, in accordance with various embodiments.

As noted above, communications along the bus 106 may occur in periodic superframes. FIG. 4 is a diagram of a superframe 190, in accordance with various embodiments. As shown in FIG. 6, a superframe may begin with a synchronization control frame 180. When the synchronization control frame 180 is used as a timing source for the PLL 128, the frequency at which superframes are communicated ("the superframe frequency") may be the same as the synchronization signal frequency. In some embodiments in which audio data is transmitted along the bus 106, the superframe frequency may be the same as the audio sampling frequency used in the system 100 (e.g., either 48 kHz or 44.1 kHz), but any suitable superframe frequency may be used. Each superframe 190 may be divided into periods of downstream transmission 192, periods of upstream transmission 194, and periods of no transmission 196 (e.g., when the bus 106 is not driven).

In FIG. 4, the superframe 190 is shown with an initial period of downstream transmission 192 and a later period of upstream transmission 194. The period of downstream transmission 192 may include a synchronization control frame 180 and X downstream data slots 198, where X can be zero. Substantially all signals on the bus 106 may be line-coded and a synchronization signal forwarded downstream from the master node 102 to the last slave node 104 (e.g., the slave node 104C) in the form of the synchronization preamble 182 in the synchronization control frame 180, as discussed above. Downstream, TDM, synchronous data may be included in the X downstream data slots 198 after the synchronization control frame 180. The downstream data slots 198 may have equal width. As discussed above, the PLL 128 may provide the clock that a node uses to time communications over the bus 106. In some embodiments in which the bus 106 is used to transmit audio data, the PLL 128 may operate at a multiple of the audio sampling frequency (e.g., 1024 times the audio sampling frequency, resulting in 1024-bit clocks in each superframe).

The period of upstream transmission 194 may include a synchronization response frame 197 and Y upstream data slots 199, where Y can be zero. In some embodiments, each slave node 104 may consume a portion of the downstream data slots 198. The last slave node (e.g., slave node 2 in FIG. 1) may respond (after a predetermined response time stored in a register of the last slave node) with a synchronization response frame 197. Upstream, TDM, synchronous data may be added by each slave node 104 in the upstream data slots 199 directly after the synchronization response frame 197. The upstream data slots 199 may have equal width. A slave node 104 that is not the last slave node (e.g., the slave nodes 0 and 1 in FIG. 1) may replace the received synchronization response frame 197 with its own upstream response if a read of one of its registers was requested in the synchronization control frame 180 of the superframe 190 or if a remote I2C read was requested in the synchronization control frame 180 of the superframe 190.

As discussed above, the synchronization control frame 180 may begin each downstream transmission. In some embodiments, the synchronization control frame 180 may be 64 bits in length, but any other suitable length may be used. The synchronization control frame 180 may begin with the preamble 182, as noted above. In some embodiments, when the synchronization control frame 180 is retransmitted by a slave node 104 to a downstream slave node 104, the preamble 182 may be generated by the transmitting slave node 104, rather than being retransmitted.

The control data 184 of the synchronization control frame 180 may include fields that contain data used to control transactions over the bus 106. Examples of these fields are discussed below, and some embodiments are illustrated in FIG. 5. In particular, FIG. 5 illustrates example formats for the synchronization control frame 180 in normal mode, I2C mode, and discovery mode, in accordance with various embodiments. In some embodiments, a different preamble 182 or synchronization control frame 180 entirely may be used in standby mode so that the slave nodes 104 do not need to receive all of the synchronization control frame 180 until a transition to normal mode is sent.

In some embodiments, the synchronization control frame 180 may include a count (CNT) field. The CNT field may have any suitable length (e.g., 2 bits) and may be incremented (modulo the length of the field) from the value used in the previous superframe. A slave node 104 that receives a CNT value that is unexpected may be programmed to return an interrupt.

In some embodiments, the synchronization control frame 180 may include a node addressing mode (NAM) field. The NAM field may have any suitable length (e.g., 2 bits) and may be used to control access to registers of a slave node 104 over the bus 106. In normal mode, registers of a slave node 104 may be read from and/or written to based on the ID of the slave node 104 and the address of the register. Broadcast transactions are writes which should be taken by every slave node 104. In some embodiments, the NAM field may provide for four node addressing modes, including "none" (e.g., data not addressed to any particular slave node 104), "normal" (e.g., data unicast to a specific slave node 104 specified in the address field discussed below), "broadcast" (e.g., addressed to all slave nodes 104), and "discovery."

In some embodiments, the synchronization control frame 180 may include an I2C field. The I2C field may have any suitable length (e.g., 1 bit) and may be used to indicate that the period of downstream transmission 192 includes an I2C transaction. The I2C field may indicate that the host 110 has provided instructions to remotely access a peripheral device 108 that acts as an I2C slave with respect to an associated slave node 104.

In some embodiments, the synchronization control frame 180 may include a node field. The node field may have any suitable length (e.g., 4 bits) and may be used to indicate which slave node is being addressed for normal and I2C accesses. In discovery mode, this field may be used to program an identifier for a newly discovered slave node 104 in a node ID register of the slave node 104. Each slave node 104 in the system 100 may be assigned a unique ID when the slave node 104 is discovered by the master node 102, as discussed below. In some embodiments, the master node 102 does not have a node ID, while in other embodiments, the master node 102 may have a node ID. In some embodiments, the slave node 104 attached to the master node 102 on the bus 106 (e.g., the slave node 0 in FIG. 1) will be slave node 0, and each successive slave node 104 will have a number that is 1 higher than the previous slave node. However, this is simply illustrative, and any suitable slave node identification system may be used.

In some embodiments, the synchronization control frame 180 may include a read/write (RW) field. The RW field may have any suitable length (e.g., 1 bit) and may be used to control whether normal accesses are reads (e.g., RW==1) or writes (e.g., RW==0).

In some embodiments, the synchronization control frame 180 may include an address field. The address field may have any suitable length (e.g., 8 bits) and may be used to address specific registers of a slave node 104 through the bus 106. For I2C transactions, the address field may be replaced with I2C control values, such as START/STOP, WAIT, RW, and DATA VLD. For discovery transactions, the address field may have a predetermined value (e.g., as illustrated in FIG. 5).

In some embodiments, the synchronization control frame 180 may include a data field. The data field may have any suitable length (e.g., 8 bits) and may be used for normal, I2C, and broadcast writes. The RESPCYCS value, multiplied by 4, may be used to determine how many cycles a newly discovered node should allow to elapse between the start of the synchronization control frame 180 being received and the start of the synchronization response frame 197 being transmitted. When the NAM field indicates discovery mode, the node address and data fields discussed below may be encoded as a RESPCYCS value that, when multiplied by a suitable optional multiplier (e.g., 4), indicates the time, in bits, from the end of the synchronization control frame 180 to the start of the synchronization response frame 197. This allows a newly discovered slave node 104 to determine the appropriate time slot for upstream transmission.

In some embodiments, the synchronization control frame 180 may include a cyclic redundancy check (CRC) field. The CRC field may have any suitable length (e.g., 16 bits) and may be used to transmit a CRC value for the control data 184 of the synchronization control frame 180 following the preamble 182. In some embodiments, the CRC may be calculated in accordance with the CCITT-CRC error detection scheme.

In some embodiments, at least a portion of the synchronization control frame 180 between the preamble 182 and the CRC field may be scrambled to reduce the likelihood that a sequence of bits in this interval will periodically match the preamble 182 (and thus may be misinterpreted by the slave node 104 as the start of a new superframe 190), as well as to reduce electromagnetic emissions as noted above. In some such embodiments, the CNT field of the synchronization control frame 180 may be used by scrambling logic to ensure that the scrambled fields are scrambled differently from one superframe to the next. Various embodiments of the system 100 described herein may omit scrambling.

Other techniques may be used to ensure that the preamble 182 can be uniquely identified by the slave nodes 104 or to reduce the likelihood that the preamble 182 shows up elsewhere in the synchronization control frame 180, in addition to or in lieu of techniques such as scrambling and/or error encoding as discussed above. For example, a longer synchronization sequence may be used to reduce the likelihood that a particular encoding of the remainder of the synchronization control frame 180 will match it. Additionally or alternatively, the remainder of the synchronization control frame may be structured so that the synchronization sequence cannot occur, such as by placing fixed "0" or "1" values at appropriate bits.

The master node 102 may send read and write requests to the slave nodes 104, including both requests specific to communication on the bus 106 and I2C requests. For example, the master node 102 may send read and write requests (indicated using the RW field) to one or more designated slave nodes 104 (using the NAM and node fields) and can indicate whether the request is a request for the slave node 104 specific to the bus 106, an I2C request for the slave node 104, or an I2C request to be passed along to an I2C-compatible peripheral device 108 coupled to the slave node 104 at one or more I2C ports of the slave node 104.

Turning to upstream communication, the synchronization response frame 197 may begin each upstream transmission. In some embodiments, the synchronization response frame 197 may be 64 bits in length, but any other suitable length may be used. The synchronization response frame 197 may also include a preamble, as discussed above with reference to the preamble 182 of the synchronization control frame 180, followed by data portion. At the end of a downstream transmission, the last slave node 104 on the bus 106 may wait until the RESPCYCS counter has expired and then begin transmitting a synchronization response frame 197 upstream. If an upstream slave node 104 has been targeted by a normal read or write transaction, a slave node 104 may generate its own synchronization response frame 197 and replace the one received from downstream. If any slave node 104 does not see a synchronization response frame 197 from a downstream slave node 104 at the expected time, the slave node 104 will generate its own synchronization response frame 197 and begin transmitting it upstream.

The data portion of the synchronization response frame 197 may include fields that contain data used to communicate response information back to the master node 102. Examples of these fields are discussed below, and some embodiments are illustrated in FIG. 6. In particular, FIG. 6 illustrates example formats for the synchronization response frame 197 in normal mode, I2C mode, and discovery mode, in accordance with various embodiments.

In some embodiments, the synchronization response frame 197 may include a count (CNT) field. The CNT field may have any suitable length (e.g., 2 bits) and may be used to transmit the value of the CNT field in the previously received synchronization control frame 180.

In some embodiments, the synchronization response frame 197 may include an acknowledge (ACK) field. The ACK field may have any suitable length (e.g., 2 bits), and may be inserted by a slave node 104 to acknowledge a command received in the previous synchronization control frame 180 when that slave node 104 generates the synchronization response frame 197. Example indicators that may be communicated in the ACK field include wait, acknowledge, not acknowledge (NACK), and retry. In some embodiments, the ACK field may be sized to transmit an acknowledgment by a slave node 104 that it has received and processed a broadcast message (e.g., by transmitting a broadcast acknowledgment to the master node 102). In some such embodiments, a slave node 104 also may indicate whether the slave node 104 has data to transmit (which could be used, for example, for demand-based upstream transmissions, such as non-TDM inputs from a keypad or touchscreen, or for prioritized upstream transmission, such as when the slave node 104 wishes to report an error or emergency condition).

In some embodiments, the synchronization response frame 197 may include an I2C field. The I2C field may have any suitable length (e.g., 1 bit) and may be used to transmit the value of the I2C field in the previously received synchronization control frame 180.

In some embodiments, the synchronization response frame 197 may include a node field. The node field may have any suitable length (e.g., 4 bits) and may be used to transmit the ID of the slave node 104 that generates the synchronization response frame 197.

In some embodiments, the synchronization response frame 197 may include a data field. The data field may have any suitable length (e.g., 8 bits), and its value may depend on the type of transaction and the ACK response of the slave node 104 that generates the synchronization response frame 197. For discovery transactions, the data field may include the value of the RESPCYCS field in the previously received synchronization control frame 180. When the ACK field indicates a NACK, or when the synchronization response frame 197 is responding to a broadcast transaction, the data field may include a broadcast acknowledge (BA) indicator (in which the last slave node 104 may indicate if the broadcast write was received without error), a discovery error (DER) indicator (indicating whether a newly discovered slave node 104 in a discovery transaction matches an existing slave node 104), and a CRC error (CER) indicator (indicating whether a NACK was caused by a CRC error).

In some embodiments, the synchronization response frame 197 may include a CRC field. The CRC field may have any suitable length (e.g., 16 bits) and may be used to transmit a CRC value for the portion of the synchronization response frame 197 between the preamble and the CRC field.

In some embodiments, the synchronization response frame 197 may include an interrupt request (IRQ) field. The IRQ field may have any suitable length (e.g., 1 bit) and may be used to indicate that an interrupt has been signaled from a slave node 104.

In some embodiments, the synchronization response frame 197 may include an IRQ node (IRQNODE) field. The IRQNODE field may have any suitable length (e.g., 4 bits) and may be used to transmit the ID of the slave node 104 that has signaled the interrupt presented by the IRQ field. In some embodiments, the slave node 104 for generating the IRQ field will insert its own ID into the IRQNODE field.

In some embodiments, the synchronization response frame 197 may include a second CRC (CRC-4) field. The CRC-4 field may have any suitable length (e.g., 4 bits) and may be used to transmit a CRC value for the IRQ and IRQNODE fields.

In some embodiments, the synchronization response frame 197 may include an IRQ field, an IRQNODE field, and a CRC-4 field as the last bits of the synchronization response frame 197 (e.g., the last 10 bits). As discussed above, these interrupt-related fields may have their own CRC protection in the form of CRC-4 (and thus not protected by the preceding CRC field). Any slave node 104 that needs to signal an interrupt to the master node 102 will insert its interrupt information into these fields. In some embodiments, a slave node 104 with an interrupt pending may have higher priority than any slave node 104 further downstream that also has an interrupt pending. The last slave node 104 along the bus 106 (e.g., the slave node 2 in FIG. 1) may always populate these interrupt fields. If the last slave node 104 has no interrupt pending, the last slave node 104 may set the IRQ bit to 0, the IRQNODE field to its node ID, and provide the correct CRC-4 value. For convenience, a synchronization response frame 197 that conveys an interrupt may be referred to herein as an "interrupt frame."

In some embodiments, at least a portion of the synchronization response frame 197 between the preamble 182 and the CRC field may be scrambled to reduce emissions. In some such embodiments, the CNT field of the synchronization response frame 197 may be used by scrambling logic to ensure that the scrambled fields are scrambled differently from one superframe to the next. Various embodiments of the system 100 described herein may omit scrambling.

Other techniques may be used to ensure that the preamble 182 can be uniquely identified by the slave nodes 104 or to reduce the likelihood that the preamble 182 shows up elsewhere in the synchronization response frame 197, in addition to or in lieu of techniques such as scrambling and/or error encoding as discussed above. For example, a longer synchronization sequence may be used to reduce the likelihood that a particular encoding of the remainder of the synchronization response frame 197 will match it. Additionally or alternatively, the remainder of the synchronization response frame may be structured so that the synchronization sequence cannot occur, such as by placing fixed "0" or "1" values at appropriate bits.

Figure 7:
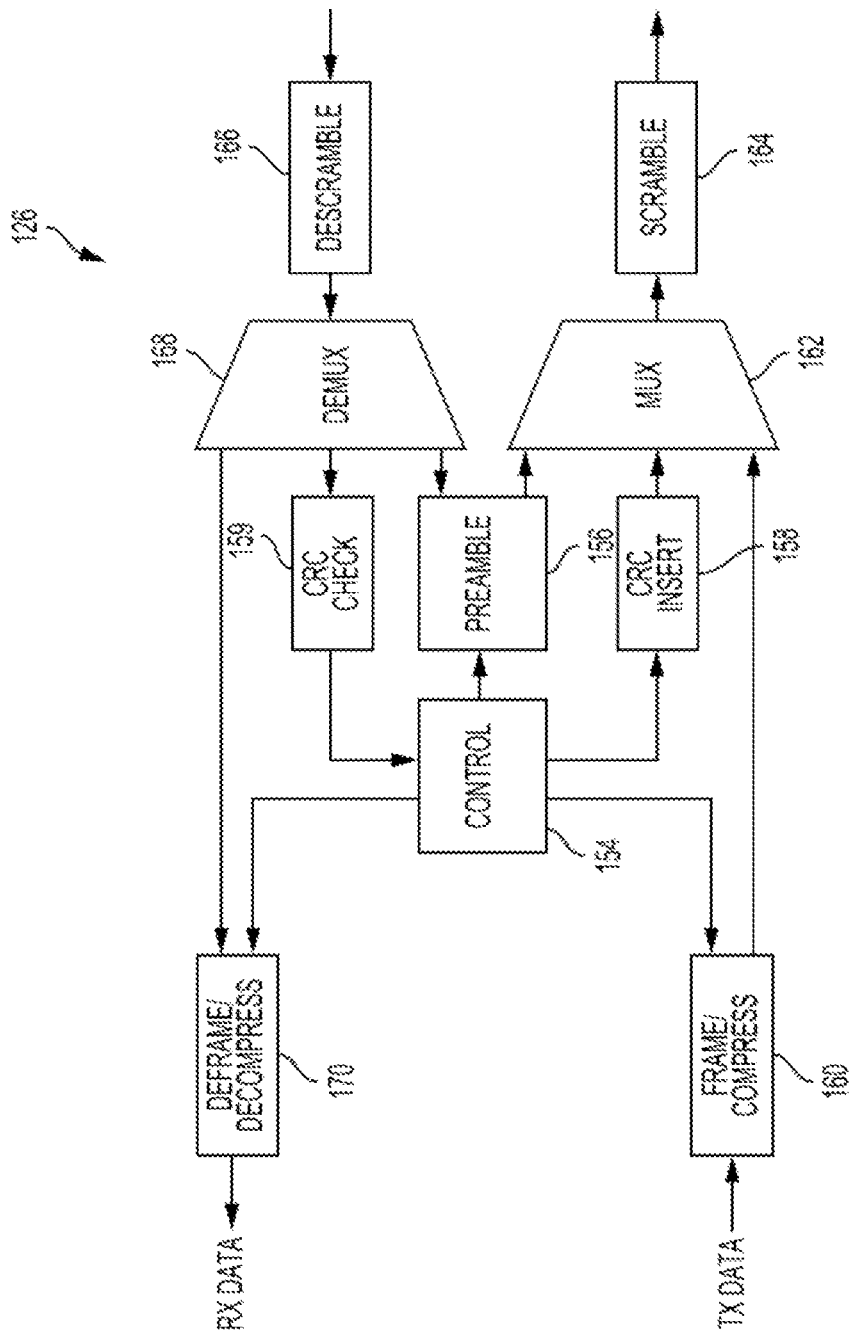
FIG. 7 is a block diagram of various components of the bus protocol circuitry of FIG. 2, in accordance with various embodiments.

FIG. 7 is a block diagram of the bus protocol circuitry 126 of FIG. 2, in accordance with various embodiments. The bus protocol circuitry 126 may include control circuitry 154 to control the operation of the node transceiver 120 in accordance with the protocol for the bus 106 described herein. In particular, the control circuitry 154 may control the generation of synchronization frames for transmission (e.g., synchronization control frames or synchronization response frames, as discussed above), the processing of received synchronization frames, and the performance of control operations specified in received synchronization control frames. The control circuitry 154 may include programmable registers, as discussed below. The control circuitry 154 may create and receive synchronization control frames, react appropriately to received messages (e.g., associated with a synchronization control frame when the bus protocol circuitry 126 is included in a slave node 104 or from an I2C device when the bus protocol circuitry 126 is included in a master node 102), and adjust the framing to the different operational modes (e.g., normal, discovery, standby, etc.).

When the node transceiver 120 is preparing data for transmission along the bus 106, preamble circuitry 156 may be configured to generate preambles for synchronization frames for transmission, and to receive preambles from received synchronization frames. In some embodiments, a downstream synchronization control frame preamble may be sent by the master node 102 every 1024 bits. As discussed above, one or more slave nodes 104 may synchronize to the downstream synchronization control frame preamble and generate local, phase-aligned master clocks from the preamble.

CRC insert circuitry 158 may be configured to generate one or more CRCs for synchronization frames for transmission. Frame/compress circuitry 160 may be configured to take incoming data from the I2S/TDM/PDM transceiver 127 (e.g., from a frame buffer associated with the transceiver 127) and/or the I2C transceiver 129, optionally compress the data, and optionally generate parity check bits or error correction codes (ECC) for the data. A multiplexer (MUX) 162 may multiplex a preamble from the preamble circuitry 156, synchronization frames, and data into a stream for transmission. In some embodiments, the transmit stream may be scrambled by scrambling circuitry 164 before transmission.

For example, in some embodiments, the frame/compress circuitry 160 may apply a floating point compression scheme. In such an embodiment, the control circuitry 154 may transmit 3 bits to indicate how many repeated sign bits are in the number, followed by a sign bit and N–4 bits of data, where N is the size of the data to be transmitted over the bus 106. The use of data compression may be configured by the master node 102 when desired.

In some embodiments, the receive stream entering the node transceiver 120 may be descrambled by the descrambling circuitry 166. A demultiplexer (DEMUX) 168 may demultiplex the preamble, synchronization frames, and data from the receive stream. CRC check circuitry 159 on the receive side may check received synchronization frames for the correct CRC. When the CRC check circuitry 159 identifies a CRC failure in an incoming synchronization control frame 180, the control circuitry 154 may be notified of the failure and will not perform any control commands in the control data 184 of the synchronization control frame 180. When the CRC check circuitry 159 identifies a CRC failure in an incoming synchronization response frame 197, the control circuitry 154 may be notified of the failure and may generate an interrupt for transmission to the host 110 in an interrupt frame. Deframe/decompress circuitry 170 may accept receive data, optionally check its parity, optionally perform error detection and correction (e.g., single error correction—double error detection (SECDED)), optionally decompress the data, and may write the receive data to the I2S/TDM/PDM transceiver 127 (e.g., a frame buffer associated with the transceiver 127) and/or the I2C transceiver 129.

As discussed above, upstream and downstream data may be transmitted along the bus 106 in TDM data slots within a superframe 190. The control circuitry 154 may include registers dedicated to managing these data slots on the bus 106, a number of examples of which are discussed below. When the control circuitry 154 is included in a master node 102, the values in these registers may be programmed into the control circuitry 154 by the host 110. When the control circuitry 154 is included in a slave node 104, the values in these registers may be programmed into the control circuitry 154 by the master node 102.

In some embodiments, the control circuitry 154 may include a downstream slots (DNSLOTS) register. When the node transceiver 120 is included in the master node 102, this register may hold the value of the total number of downstream data slots. This register may also define the number of data slots that will be used for combined I2S/TDM/PDM receive by the I2S/TDM/PDM transceiver 127 in the master node 102. In a slave node 104, this register may define the number of data slots that are passed downstream to the next slave node 104 before or after the addition of locally generated downstream slots, as discussed in further detail below with reference to LDNSLOTS.

In some embodiments, the control circuitry 154 may include a local downstream slots (LDNSLOTS) register. This register may be unused in the master node 102. In a slave node 104, this register may define the number of data slots that the slave node 104 will use and not retransmit. Alternatively, this register may define the number of slots that the slave node 104 may contribute to the downstream bus link 106.

In some embodiments, the control circuitry 154 may include an upstream slots (UPSLOTS) register. In the master node 102, this register may hold the value of the total number of upstream data slots. This register may also define the number of slots that will be used for I2S/TDM transmit by the I2S/TDM/PDM transceiver 127 in the master node 102. In a slave node 104, this register may define the number of data slots that are passed upstream before the slave node 104 begins to add its own data.

In some embodiments, the control circuitry 154 may include a local upstream slots (LUPSLOTS) register. This register may be unused in the master node 102. In a slave node 104, this register may define the number of data slots that the slave node 104 will add to the data received from downstream before it is sent upstream. This register may also define the number of data slots that will be used for combined I2S/TDM/PDM receive by the I2S/TDM/PDM transceiver 127 in the slave node 104.

In some embodiments, the control circuitry 154 may include a broadcast downstream slots (BCDNSLOTS) register. This register may be unused in the master node 102. In a slave node 104, this register may define the number of broadcast data slots. In some embodiments, broadcast data slots may always come at the beginning of the data field. The data in the broadcast data slots may be used by multiple slave nodes 104 and may be passed downstream by all slave nodes 104 whether or not they are used.

In some embodiments, the control circuitry 154 may include a slot format (SLOTFMT) register. This register may define the format of data for upstream and downstream transmissions. The data size for the I2S/TDM/PDM transceiver 127 may also be determined by this register. In some embodiments, valid data sizes include 8, 12, 16, 20, 24, 28, and 32 bits. This register may also include bits to enable floating point compression for downstream and upstream traffic. When floating point compression is enabled, the I2S/TDM data size may be 4 bits larger than the data size over the bus 106. All nodes in the system 100 may have the same values for SLOTFMT when data slots are enabled, and the nodes may be programmed by a broadcast write so that all nodes will be updated with the same value.

FIGS. 8-11 illustrate examples of information exchange along the bus 106, in accordance with various embodiments of the bus protocols described herein. In particular, FIGS. 8-11 illustrate embodiments in which each slave node 104 is coupled to one or more speakers and/or one or more microphones as the peripheral device 108. This is simply illustrative, as any desired arrangement of peripheral device 108 may be coupled to any particular slave node 104 in accordance with the techniques described herein.

Figure 8:
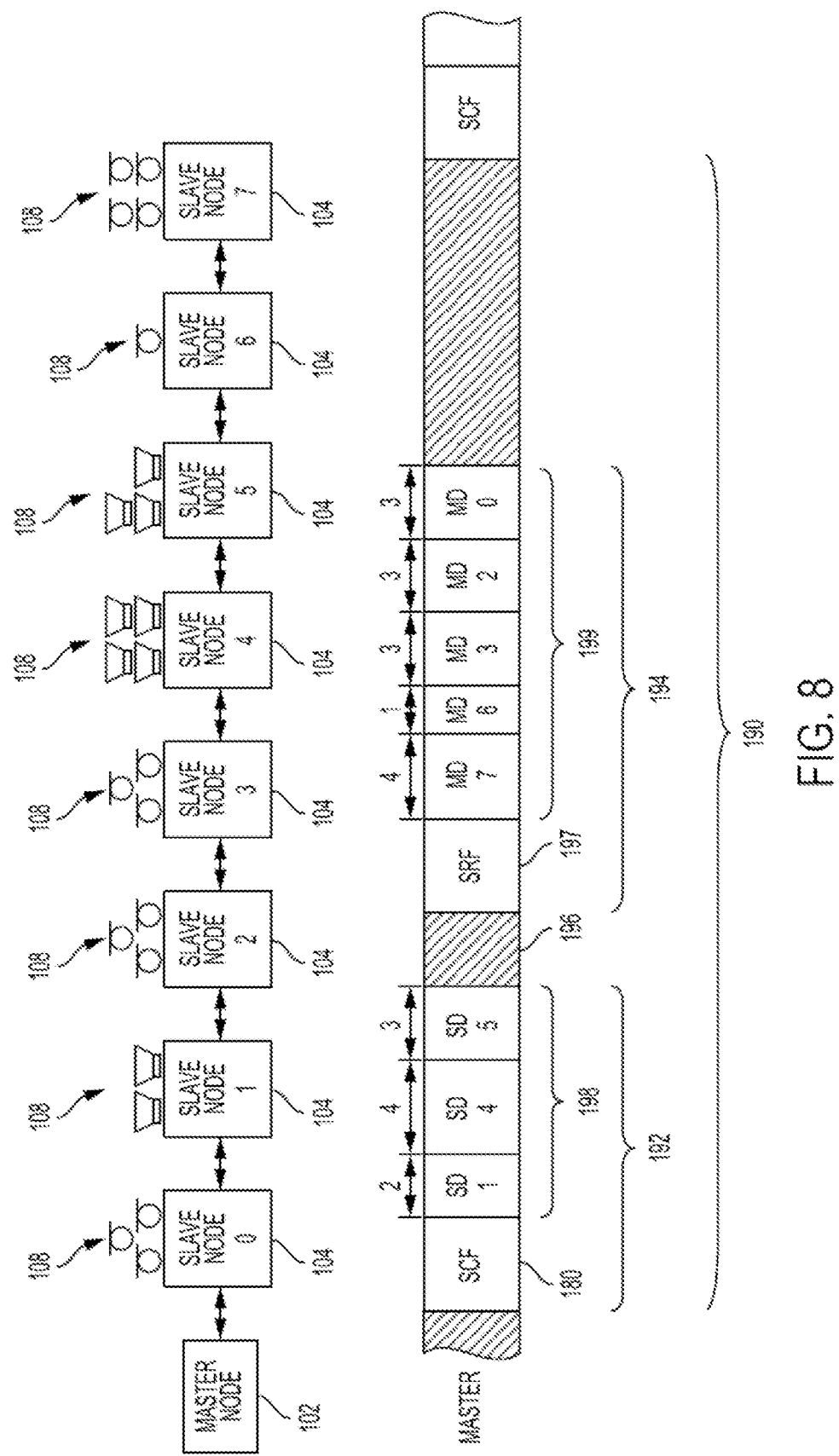
FIGS. 8-11 illustrate examples of information exchange along a two-wire bus, in accordance with various embodiments of the bus protocols described herein.

To begin, FIG. 8 illustrates signaling and timing considerations for bi-directional communication on the bus 106, in accordance with various embodiments. The slave nodes 104 depicted in FIG. 8 have various numbers of sensor/actuator elements, and so different amounts of data may be sent to, or received from, the various slave nodes 104. Specifically, slave node 1 has two elements, slave node 4 has four elements, and slave node 5 has three elements, so the data transmitted by the master node 102 includes two time slots for slave node 1, four time slots for slave node 4, and three time slots for slave node 5. Similarly, slave node 0 has three elements, slave node 2 has three elements, slave node 3 has three elements, slave node 6 has one element, and slave node 7 has four elements, so the data transmitted upstream by those slave nodes 104 includes the corresponding number of time slots. It should be noted that there need not have to be a one-to-one correlation between elements and time slots. For example, a microphone array, included in the peripheral device 108, having three microphones may include a DSP that combines signals from the three microphones (and possibly also information received from the master node 102 or from other slave nodes 104) to produce a single data sample, which, depending on the type of processing, could correspond to a single time slot or multiple time slots.

In FIG. 8, the master node 102 transmits a synchronization control frame (SCF) followed by data for speakers coupled to specific slave nodes 104 (SD). Each successive slave node 104 forwards the SCF and also forwards at least any data destined for downstream slave nodes 104. A particular slave node 104 may forward all data or may remove data destined for that slave node 104. When the last slave node 104 receives the SCF, that slave node 104 transmits the synchronization response frame (SRF) optionally followed by any data that the slave node 104 is permitted to transmit. Each successive slave node 104 forwards the SRF along with any data from downstream slave nodes 104 and optionally inserts data from one or more microphones coupled to the particular slave nodes 104 (MD). In the example of FIG. 8, the master node 102 sends data to slave nodes 1, 4, and 5 (depicted in FIG. 8 as active speakers) and receives data from slave nodes 7, 6, 3, 2, and 0 (depicted in FIG. 8 as microphone arrays).

Figure 9:
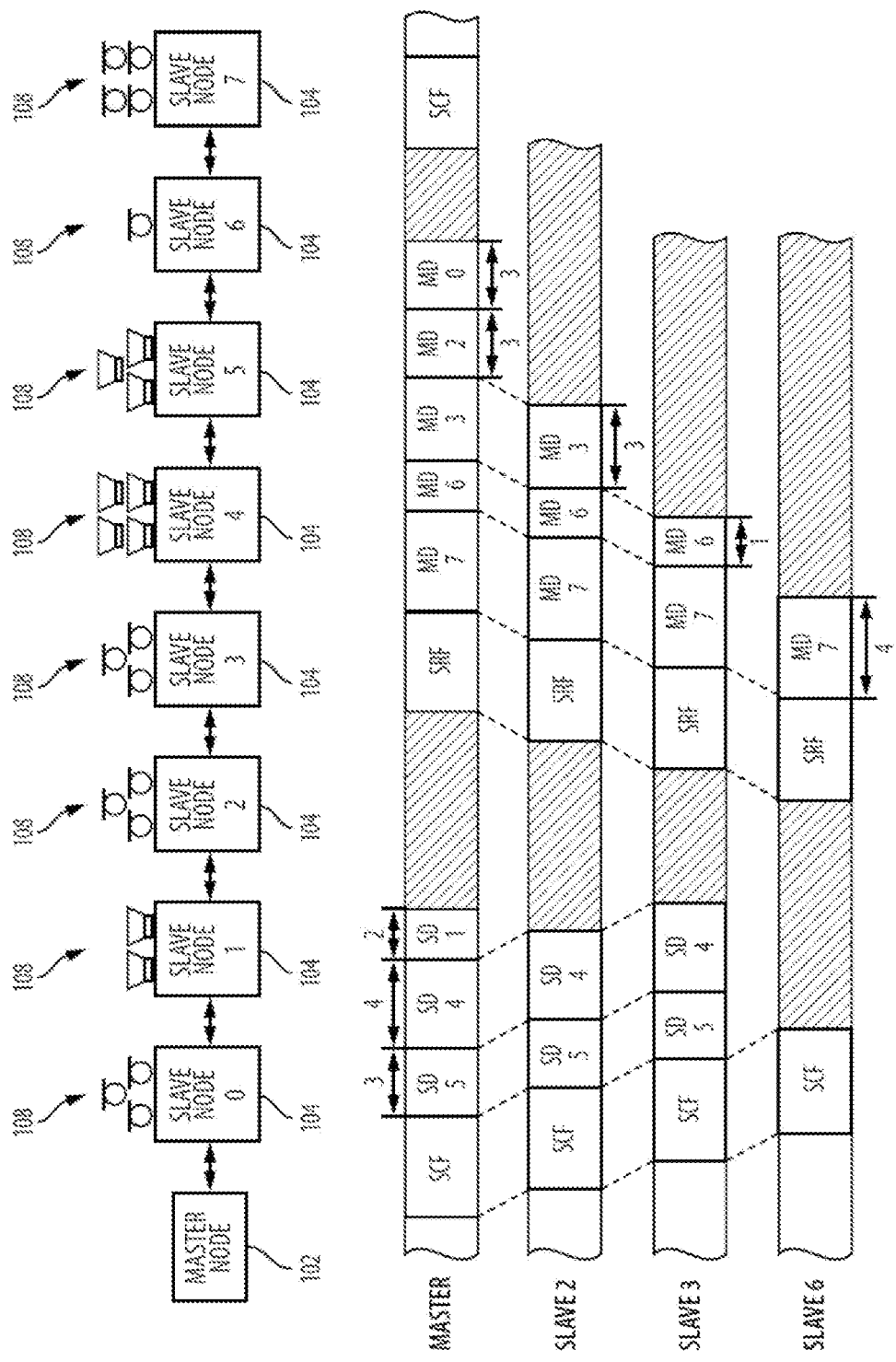

FIG. 9 schematically illustrates the dynamic removal of data from a downstream transmission and insertion of data into an upstream transmission, from the perspective of the downstream DS transceiver 124, in accordance with various embodiments. In FIG. 9, as in FIG. 8, the master node 102 transmits a SCF followed by data for slave nodes 1, 4, and 5 (SD) in reverse order (e.g., data for slave node 5 is followed by data for slave node 4, which is followed by data for slave node 1, etc.) (see the row labeled MASTER). When slave node 1 receives this transmission, slave node 1 removes its own data and forwards to slave node 2 only the SCF followed by the data for slave nodes 5 and 4. Slave nodes 2 and 3 forward the data unchanged (see the row labeled SLAVE 2), such that the data forwarded by slave node 1 is received by slave node 4 (see the row labeled SLAVE 3). Slave node 4 removes its own data and forwards to slave node 5 only the SCF followed by the data for slave node 5, and, similarly, slave node 5 removes its own data and forwards to slave node 6 only the SCF. Slave node 6 forwards the SCF to slave node 7 (see the row labeled SLAVE 6).

At this point, slave node 7 transmits to slave node 6 the SRF followed by its data (see the row labeled SLAVE 6). Slave node 6 forwards to slave node 5 the SRF along with the data from slave node 7 and its own data, and slave node 5 in turn forwards to slave node 4 the SRF along with the data from slave nodes 7 and 6. Slave node 4 has no data to add, so it simply forwards the data to slave node 3 (see the row labeled SLAVE 3), which forwards the data along with its own data to slave node 2 (see the row labeled SLAVE 2), which in turn forwards the data along with its own data to slave node 1. Slave node 1 has no data to add, so it forwards the data to slave node 0, which forwards the data along with its own data. As a result, the master node 102 receives the SRF followed by the data from slave nodes 7, 6, 3, 2, and 0 (see the row labeled MASTER).

Figure 10:
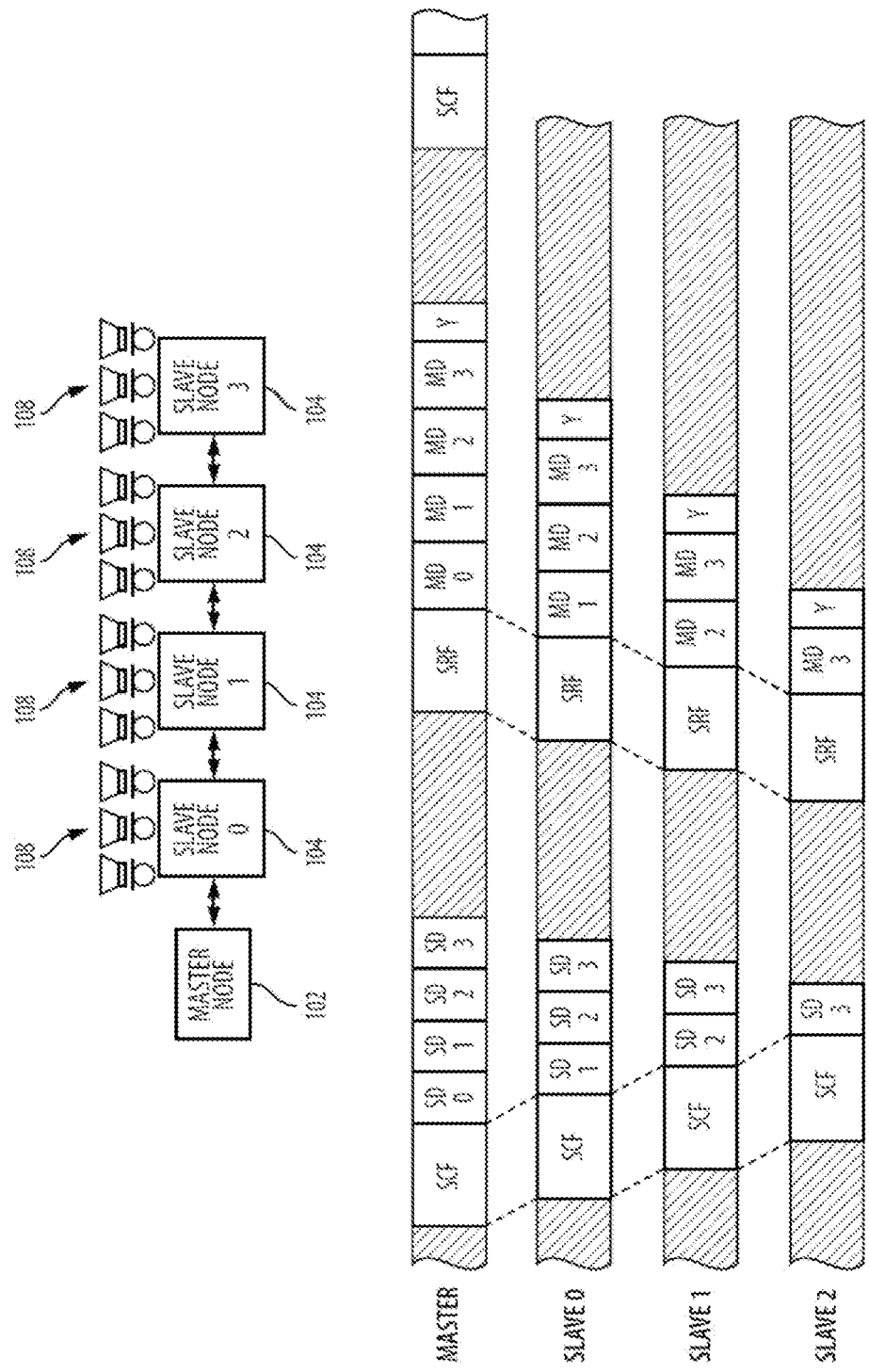

FIG. 10 illustrates another example of the dynamic removal of data from a downstream transmission and insertion of data into an upstream transmission, from the perspective of the downstream DS transceiver 124, as in FIG. 9, although in FIG. 10, the slave nodes 104 are coupled with both sensors and actuators as the peripheral device 108 such that the master node 102 sends data downstream to all the slave nodes 104 and receives data back from all the slave nodes 104. Also, in FIG. 10, the data is ordered based on the node address to which it is destined or from which it originates. The data slot labeled "V" may be used for a data integrity check or data correction.

Figure 11:
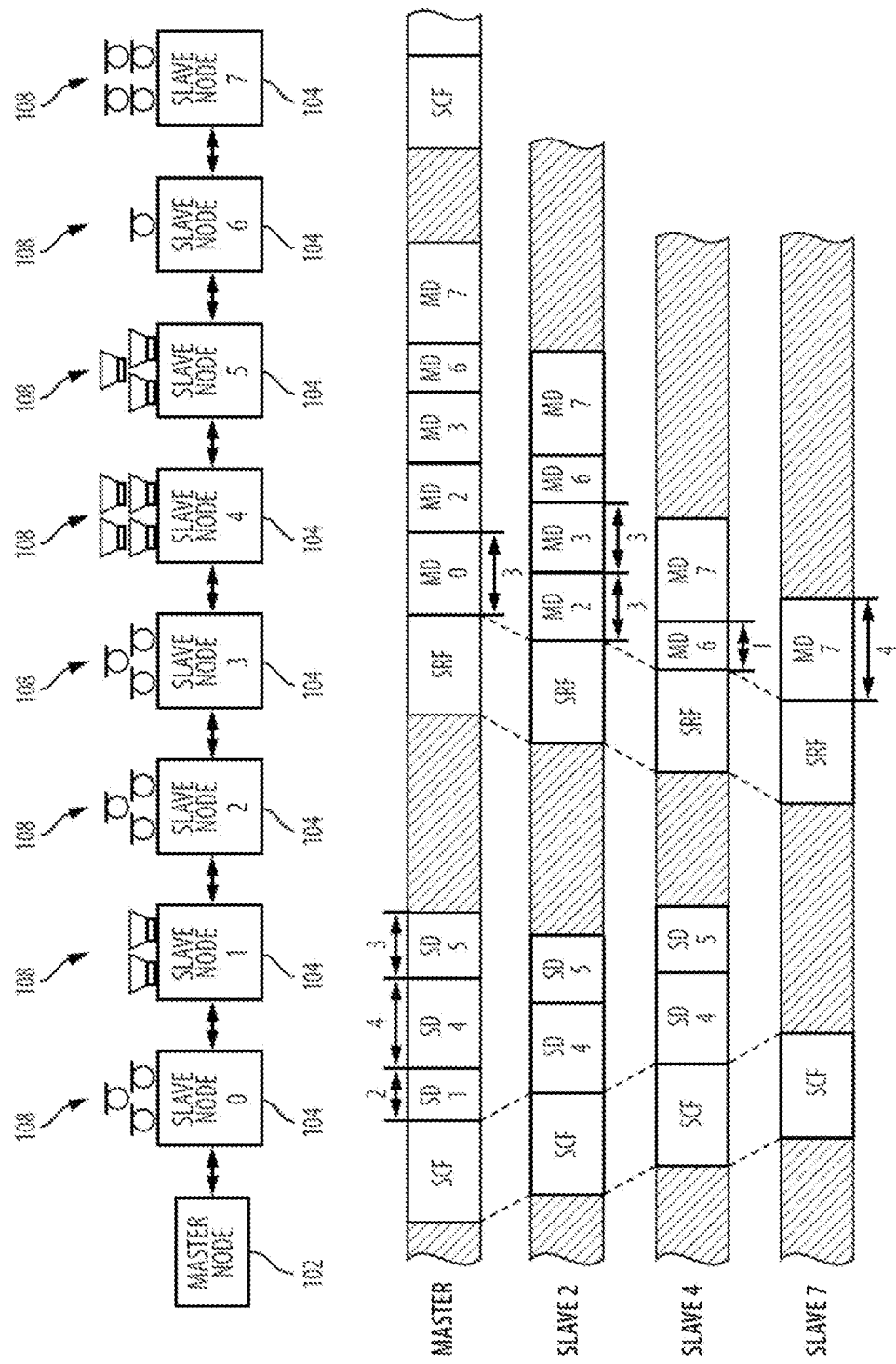

FIG. 11 illustrates another example of the dynamic removal of data from a downstream transmission and insertion of data into an upstream transmission, from the perspective of the downstream DS transceiver 124, as in FIG. 9, although in FIG. 11, the data is conveyed downstream and upstream in sequential order rather than reverse order. Buffering at each slave node 104 allows for selectively adding, removing, and/or forwarding data.

As discussed above, each slave node 104 may remove data from downstream or upstream transmissions and/or may add data to downstream or upstream transmissions. Thus, for example, the master node 102 may transmit a separate sample of data to each of a number of slave nodes 104, and each such slave node 104 may remove its data sample and forward only data intended for downstream slaves. On the other hand, a slave node 104 may receive data from a downstream slave node 104 and forward the data along with additional data. One advantage of transmitting as little information as needed is to reduce the amount of power consumed collectively by the system 100.

The system 100 may also support broadcast transmissions (and multicast transmissions) from the master node 102 to the slave nodes 104, specifically through configuration of the downstream slot usage of the slave nodes 104. Each slave node 104 may process the broadcast transmission and pass it along to the next slave node 104, although a particular slave node 104 may "consume" the broadcast message, (i.e., not pass the broadcast transmission along to the next slave node 104).

The system 100 may also support upstream transmissions (e.g., from a particular slave node 104 to one or more other slave nodes 104). Such upstream transmissions can include unicast, multicast, and/or broadcast upstream transmissions. With upstream addressing, as discussed above with reference to downstream transmissions, a slave node 104 may determine whether or not to remove data from an upstream transmission and/or whether or not to pass an upstream transmission along to the next upstream slave node 104 based on configuration of the upstream slot usage of the slave nodes 104. Thus, for example, data may be passed by a particular slave node 104 to one or more other slave nodes 104 in addition to, or in lieu of, passing the data to the master node 102. Such slave-slave relationships may be configured, for example, via the master node 102.

Thus, in various embodiments, the slave nodes 104 may operate as active/intelligent repeater nodes, with the ability to selectively forward, drop, and add information. The slave nodes 104 may generally perform such functions without necessarily decoding/examining all the data, since each slave node 104 knows the relevant time slot(s) within which it will receive/transmit data, and hence can remove data from or add data into a time slot. Notwithstanding that the slave nodes 104 may not need to decode/examine all data, the slave nodes 104 may typically re-clock the data that it transmits/forwards. This may improve the robustness of the system 100.

Figure 12:
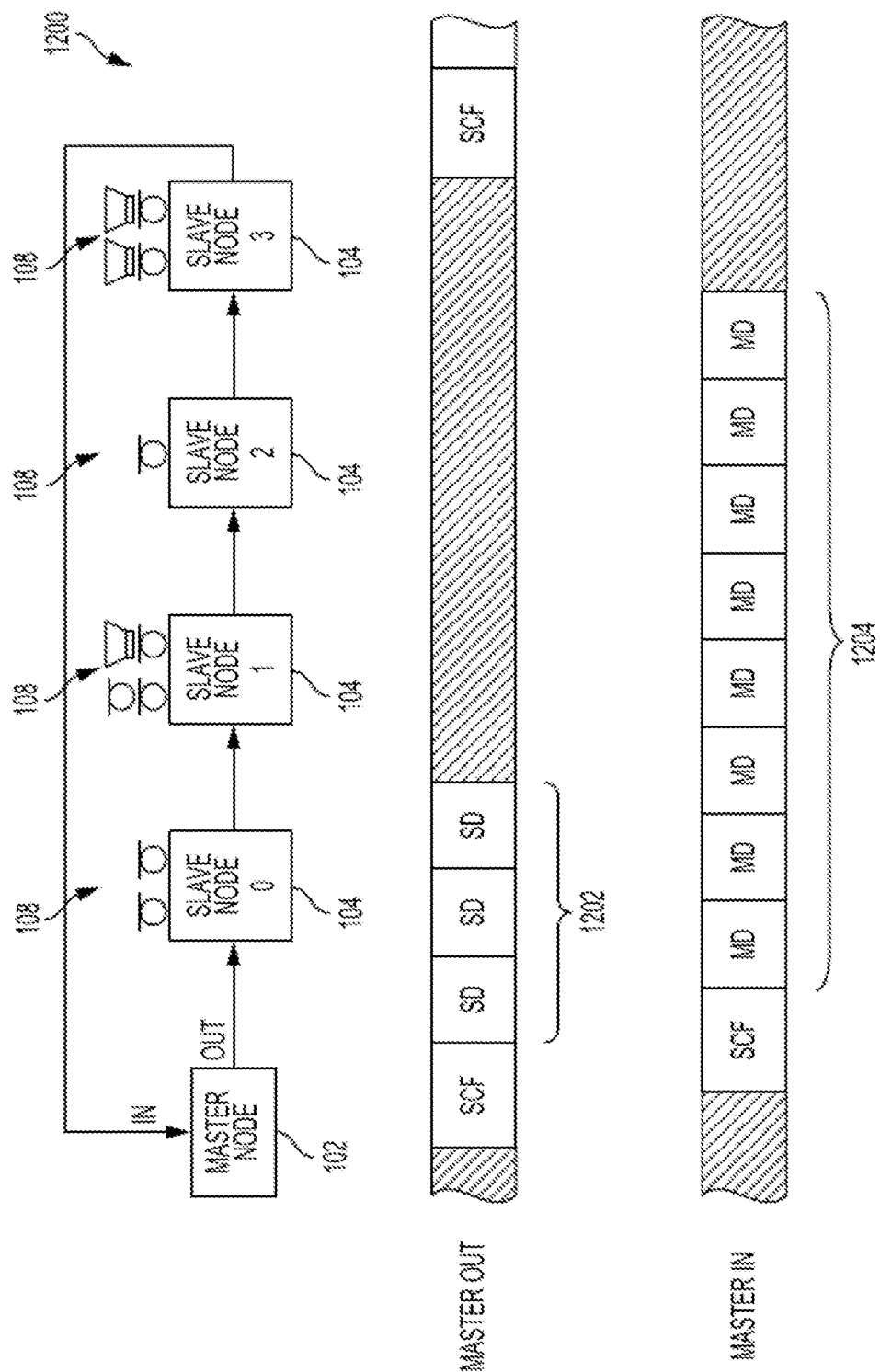
FIG. 12 illustrates a ring topology for the two-wire bus and a unidirectional communication scheme thereon, in accordance with various embodiments.

In some embodiments, the bus 106 may be configured for unidirectional communications in a ring topology. For example, FIG. 12 illustrates an arrangement 1200 of the master node 102 and four slave nodes 104 in a ring topology, and illustrates signaling and timing considerations for unidirectional communication in the arrangement 1200, in accordance with various embodiments. In such embodiments, the node transceivers 120 may include a receive-only transceiver (MASTER IN) and a transmit-only transceiver (MASTER OUT), rather than two bi-directional transceivers for upstream and downstream communication. In the link-layer synchronization scheme illustrated in FIG. 12, the master node 102 transmits a SCF 180, optionally followed by "downstream" data 1202 for the three speakers coupled to various slave nodes 104 (the data for the different speakers may be arranged in any suitable order, as discussed above with reference to FIGS. 8-11), and each successive slave node 104 forwards the synchronization control frame 180 along with any "upstream" data from prior slave nodes 104 and "upstream" data of its own to provide "upstream" data 1204 (e.g., the data from the eight different microphones may be arranged in any suitable order, as discussed above with reference to FIGS. 8-11).

As described herein, data may be communicated between elements of the system 100 in any of a number of ways. In some embodiments, data may be sent as part of a set of synchronous data slots upstream (e.g., using the data slots 199) by a slave node 104 or downstream (e.g., using the data slots 198) by a slave node 104 or a master node 102. The volume of such data may be adjusted by changing the number of bits in a data slot, or including extra data slots. Data may also be communicated in the system 100 by inclusion in a synchronization control frame 180 or a synchronization response frame 197. Data communicated this way may include I2C control data from the host 110 (with a response from a peripheral device 108 associated with a slave node 104); accesses to registers of the slave nodes 104 (e.g., for discovery and configuration of slots and interfaces) that may include write access from the host 110/master node 102 to a slave node 104 and read access from a slave node 104 to the host 110/master node 102; and event signaling via interrupts from a peripheral device 108 to the host 110. In some embodiments, GPIO pins may be used to convey information from a slave node 104 to the master node 102 (e.g., by having the master node 102 poll the GPIO pins over I2C, or by having a node transceiver 120 of a slave node 104 generate an interrupt at an interrupt request pin). For example, in some such embodiments, a host 110 may send information to the master node 102 via I2C, and then the master node 102 may send that information to the slave via the GPIO pins. Any of the types of data discussed herein as transmitted over the bus 106 may be transmitted using any one or more of these communication pathways. Other types of data and data communication techniques within the system 100 may be disclosed herein.

Figure 13:
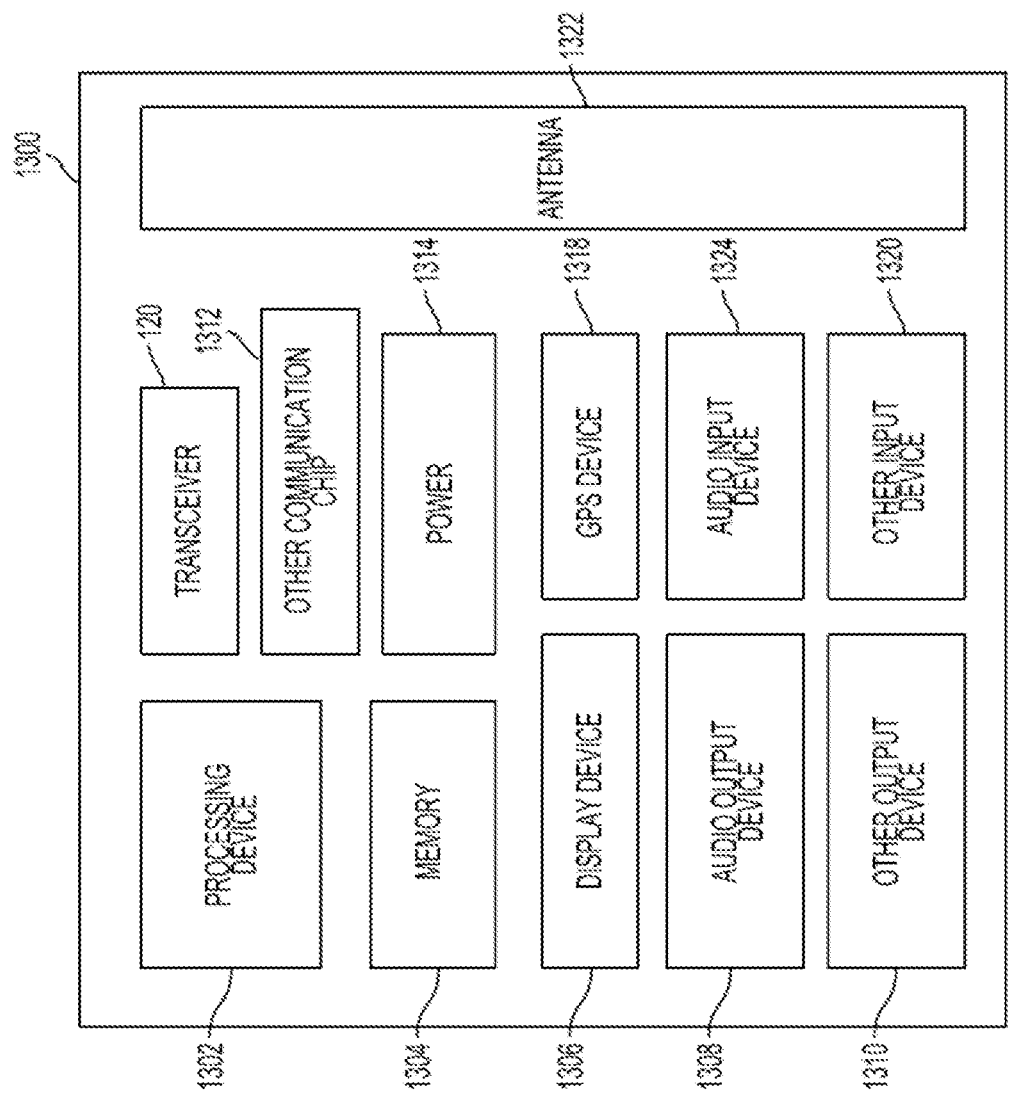
FIG. 13 schematically illustrates a device that may serve as a node or host in the system of FIG. 1, in accordance with various embodiments.

Embodiments of the present disclosure may be implemented into a system using any suitable hardware and/or software to configure as desired. FIG. 13 schematically illustrates a device 1300 that may serve as a host or a node (e.g., a host 110, a master node 102, or a slave node 104) in the system 100, in accordance with various embodiments. A number of components are illustrated in FIG. 13 as included in the device 1300, but any one or more of these components may be omitted or duplicated, as suitable for the application.

Additionally, in various embodiments, the device 1300 may not include one or more of the components illustrated in FIG. 13, but the device 1300 may include interface circuitry for coupling to the one or more components. For example, the device 1300 may not include a display device 1306, but may include display device interface circuitry (e.g., a connector and driver circuitry) to which a display device 1306 may be coupled. In another set of examples, the device 1300 may not include an audio input device 1324 or an audio output device 1308, but may include audio input or output device interface circuitry (e.g., connectors and supporting circuitry) to which an audio input device 1324 or audio output device 1308 may be coupled.

The device 1300 may include the node transceiver 120, in accordance with any of the embodiments disclosed herein, for managing communication along the bus 106 when the device 1300 is coupled to the bus 106. The device 1300 may include a processing device 1302 (e.g., one or more processing devices), which may be included in the node transceiver 120 or separate from the node transceiver 120. As used herein, the term "processing device" may refer to any device or portion of a device that processes electronic data from registers and/or memory to transform that electronic data into other electronic data that may be stored in registers and/or memory. The processing device 1302 may include one or more DSPs, ASICs, central processing units (CPUs), graphics processing units (GPUs), cryptoprocessors, or any other suitable processing devices. The device 1300 may include a memory 1304, which may itself include one or more memory devices such as volatile memory (e.g., dynamic random access memory (DRAM)), non-volatile memory (e.g., read-only memory (ROM)), Flash memory, solid state memory, and/or a hard drive.

In some embodiments, the memory 1304 may be employed to store a working copy and a permanent copy of programming instructions to cause the device 1300 to perform any suitable ones of the techniques disclosed herein. In some embodiments, machine-accessible media (including non-transitory computer-readable storage media), methods, systems, and devices for performing the above-described techniques are illustrative examples of embodiments disclosed herein for communication over a two-wire bus. For example, a computer-readable media (e.g., the memory 1304) may have stored thereon instructions that, when executed by one or more of the processing devices included in the processing device 1302, cause the device 1300 to perform any of the techniques disclosed herein.

In some embodiments, the device 1300 may include another communication chip 1312 (e.g., one or more other communication chips). For example, the communication chip 1312 may be configured for managing wireless communications for the transfer of data to and from the device 1300. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not.

The communication chip 1312 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The one or more communication chips 1312 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The one or more communication chips 1312 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The one or more communication chips 1312 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication chip 1312 may operate in accordance with other wireless protocols in other embodiments. The device 1300 may include an antenna 1322 to facilitate wireless communications and/or to receive other wireless communications (such as AM or FM radio transmissions).

In some embodiments, the communication chip 1312 may manage wired communications using a protocol other than the protocol for the bus 106 described herein. Wired communications may include electrical, optical, or any other suitable communication protocols. Examples of wired communication protocols that may be enabled by the communication chip 1312 include Ethernet, controller area network (CAN), I2C, media-oriented systems transport (MOST), or any other suitable wired communication protocol.

As noted above, the communication chip 1312 may include multiple communication chips. For instance, a first communication chip 1312 may be dedicated to shorter-range wireless communications such as Wi-Fi or Bluetooth, and a second communication chip 1312 may be dedicated to longer-range wireless communications such as global positioning system (GPS), EDGE, GPRS, CDMA, WiMAX, LTE, EV-DO, or others. In some embodiments, a first communication chip 1312 may be dedicated to wireless communications, and a second communication chip 1312 may be dedicated to wired communications.

The device 1300 may include battery/power circuitry 1314. The battery/power circuitry 1314 may include one or more energy storage devices (e.g., batteries or capacitors) and/or circuitry for coupling components of the device 1300 to an energy source separate from the device 1300 (e.g., AC line power, voltage provided by a car battery, etc.). For example, the battery/power circuitry 1314 may include the upstream filtering circuitry 132 and the downstream filtering circuitry 131 discussed above with reference to FIG. 2 and could be charged by the bias on the bus 106. The battery/power circuitry 1314 may include any of the supporting circuitry 320 or 321 discussed below.

The device 1300 may include a display device 1306 (or corresponding interface circuitry, as discussed above). The display device 1306 may include any visual indicators, such as a heads-up display, a computer monitor, a projector, a touchscreen display, a liquid crystal display (LCD), a light-emitting diode display, or a flat panel display, for example.

The device 1300 may include an audio output device 1308 (or corresponding interface circuitry, as discussed above). The audio output device 1308 may include any device that generates an audible indicator, such as speakers, headsets, or earbuds, for example.

The device 1300 may include an audio input device 1324 (or corresponding interface circuitry, as discussed above). The audio input device 1324 may include any device that generates a signal representative of a sound, such as microphones, microphone arrays, or digital instruments (e.g., instruments having a MIDI output).

The device 1300 may include a GPS device 1318 (or corresponding interface circuitry, as discussed above). The GPS device 1318 may be in communication with a satellite-based system and may receive a location of the device 1300, as known in the art.

The device 1300 may include another output device 1310 (or corresponding interface circuitry, as discussed above). Examples of the other output device 1310 may include an audio codec, a video codec, a printer, a wired or wireless transmitter for providing information to other devices, or an additional storage device. Additionally, any suitable ones of the peripheral devices 108 discussed herein may be included in the other output device 1310.

The device 1300 may include another input device 1320 (or corresponding interface circuitry, as discussed above). Examples of the other input device 1320 may include an accelerometer, a gyroscope, an image capture device, a keyboard, a cursor control device such as a mouse, a stylus, a touchpad, a bar code reader, a Quick Response (QR) code reader, or a radio frequency identification (RFID) reader. Additionally, any suitable ones of the sensors or peripheral devices 108 discussed herein may be included in the other input device 1320.

Any suitable ones of the display, input, output, communication, or memory devices described above with reference to the device 1300 may serve as the peripheral device 108 in the system 100. Alternatively or additionally, suitable ones of the display, input, output, communication, or memory devices described above with reference to the device 1300 may be included in a host (e.g., the host 110) or a node (e.g., a master node 102 or a slave node 104).

As discussed above, the two-wire communication systems 100 disclosed herein may provide data communication and control over multiple nodes coupled together by segments of a two-wire bus 106 (e.g., a twisted wire pair). The protocols disclosed herein for communication over the two-wire bus 106 supports multiple data channels. In some embodiments, digital data used to interface to other industry-standard digital communication interfaces may be transmitted over the two-wire bus 106. In particular, the systems and techniques disclosed herein may be used to provide one or more multiple digital interfaces in a single two-wire communication system 100. For example, the systems and techniques disclosed herein may be used to provide one or more channels of digital audio, SPI connections to a microprocessor, and CAN interfacing to other nodes. In another example, digital control information and data from a CAN interface of one node may be connected to an SPI interface at another node along the two-wire bus 106 (thereby "bridging" the CAN interface and the SPI interface).

In some embodiments, the systems and methods disclosed herein may be used to provide higher-level system data between different nodes in a two-wire communication system 100. For example, in automotive radio tuners, digital data such as song title, artist, and album cover art images may be transmitted from a master node 102 (associated with a tuner) to a slave node 104 (associated with a user interface, such as a display). The digital interface between the master node 102 and the tuner, and/or the digital interface between the slave node 104 and the user interface, may be the same or may be different, and the methods disclosed herein may be used to carry out appropriate translation (e.g., via software protocols in application code) between the devices. The systems and methods disclosed herein may support various digital interfaces (e.g., SPI, CAN, UART, MIDI, etc.), and may also allow support for higher-level system functions, such as collision detection, error detection and retransmission, etc.

The digital interface systems and techniques disclosed herein may utilize the I2S/TDM/PDM transceiver 127 in a node transceiver 120 to implement an application layer software protocol to carry out the desired digital communication between the node transceiver 120 and an external device 155 as part of an arrangement 165. The digital interface systems and techniques disclosed herein may be particularly useful when communications between a node transceiver 120 and an external device are desired at higher speeds than can be provided by the I2C transceiver 129.

Figure 14:
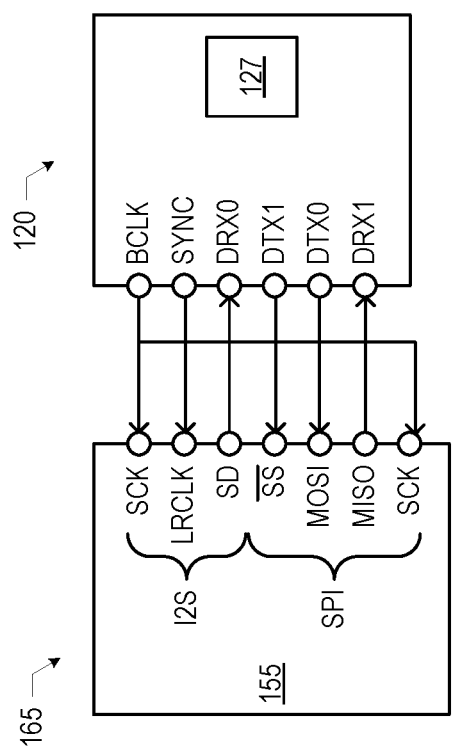
FIG. 14 is a block diagram of an example arrangement between a transceiver and an external device, in accordance with various embodiments.

FIG. 14 is a block diagram of an example arrangement 165 between a transceiver 129 and an external device 155, in accordance with various embodiments. The arrangement 165 of FIG. 14 may be an example of the arrangement 165 of FIG. 2. Although the arrangement 165 of FIG. 14 illustrates an embodiment in which the transceiver 129 and the external device 155 communicate via the SPI protocol, in other embodiments, this communication may be conducted in accordance with other protocols (e.g., CAN, UART, or MIDI). Further, although the arrangement 165 of FIG. 14 illustrates particular transmit and receive pins of the node transceiver 120 being coupled to particular pins of the external device 155, the roles of different ones of the transmit pins (and different ones of the receive pins) may be swapped. For example, the transmit pin DTX0 may be connected as described with reference to the transmit pin DTX1 and vice versa.

As discussed above with reference to FIG. 2, the node transceiver 120 may include a BCLK pin, a SYNC pin, two receive pins (DRX0 and DRX1), and two transmit pins (DTX0 and DTX1). The external device 155 may include two sets of pins: a set of pins for I2S communication (including continuous serial clock (SCK), left-right clock (LRCLK), and serial data (SD)) and a set of pins for SPI communication (including slave select (SS), master out slave in (MOSI), master in slave out (MISO), and serial clock (SCK)). In some embodiments, the SS pin of the external device 155 may instead be a/SS pin. Although a single external device 155 is illustrated in FIG. 14 as including the I2S pins and the SPI pins, this is simply for ease of illustration, and in other embodiments, one external device 155 may include the I2S pins and a different external device 155 may include the SPI pins. In some embodiments, multiple external devices 155 may share the same I2S interface with each tri-stating, unused I2S/TDM channel on their transmitter in such a way that multiple devices 155 can contribute to the I2S/TDM content and each can select which I2S/TDM channels to use. In some embodiments, multiple external devices 155 may share the same SPI interface but may have different, individual SS signals; a transceiver 127 may provide multiple DTX signals to provide an individual DTX to SS signal for each of these external devices 155.

The transceiver 127 may be configured to act as both an I2S receiver and as an SPI master in the arrangement 165. In particular, the BCLK pin of the node transceiver 120 may be coupled to the (I2S) SCK pin of the external device 155, the SYNC pin of the node transceiver 120 may be coupled to the LRCLK pin of the external device 155, and the DRX0 pin of the node transceiver 120 may be coupled to the SD pin of the external device 155; the transceiver 127, and the external device 155, may control the electrical signals over these pins to communicate in accordance with the I2S protocol. Also, the BCLK pin of the node transceiver 120 may be coupled to the (SPI) SCK pin of the external device 155, the DTX1 pin of the node transceiver 120 may be coupled to the SS pin of the external device 155, the DTX0 pin of the node transceiver 120 may be coupled to the MOSI pin of the external device 155, and the DRX1 pin of the node transceiver 120 may be coupled to the MISO pin of the external device 155; the transceiver 127, and the external device 155, may control the electrical signals over these pins to communicate in accordance with the SPI protocol.

SPI communication between the transceiver 127 and the external device 155 may be performed in accordance with any suitable SPI mode (e.g., mode 0, mode 1, mode 2, or mode 3). For example, in SPI mode 0, the transceiver 127 may transmit MOSI data via the DTX0 pin such that the MOSI data changes on the falling edge of the BCLK signal and is clocked into the external device 155 on the rising edge of the BCLK signal. The transceiver 127 may receive MISO data via the DRX1 pin such that the MISO data changes on the falling edge of the BCLK signal and is clocked into the transceiver 127 on the rising edge of the BCLK signal. MISO data may be driven onto the DRX1 pin in the same frame as MOSI data is transmitted by the DTX0 pin. The SS signal will also change with the falling edge of the BCLK signal, and the transceiver 127 may drive the DTX1 pin with the appropriate data pattern to achieve a desired SS signal. In some embodiments, the BCLK signal used during SPI communication may be a gated clock. The SPI communication between the node transceiver 120 and the external device 155 may be used to transmit data from the external device 155 to the node transceiver 120 (and, from there, to other nodes along the two-wire communication bus 106 in accordance with any of the techniques disclosed herein). Further, the SPI communication between the node transceiver 120 and the external device 155 may be used to transmit data received at the node transceiver 120 from another node along the two-wire communication bus (in accordance with any of the techniques disclosed herein) to the external device 155. The external device 155 with which the transceiver 127 communicates may be any suitable device; for example, the external device 155 may include a DSP. Multiple-byte read/writes over the SPI interface may be supported (e.g., up to 8 bytes per frame). For example, up to 7 bytes per audio frame may be transmitted while one byte is "HIGH" (or "LOW," as appropriate) on the SS pin; this example provided data rate of 2.68 megabits per second. In some embodiments, 64 bits of data may be provided in each frame; at a frequency of 48 kilohertz, and with two channels of communication, this may result in a data rate of 3.072 megabits per second. Fewer than 64 bits of data may be provided in each frame, resulting in a lower bandwidth.

The I2S communication between the node transceiver 120 and the external device 155 may be used to transmit data from the external device 155 to the node transceiver 120 (and, from there, to other nodes along the two-wire communication bus 106 in accordance with any of the techniques disclosed herein). For example, the external device 155 may include a tuner that provides audio data to the node transceiver 120 via the I2S interface of the arrangement 165 of FIG. 14. Communication via the I2S interface and the SPI interface of the arrangement 165 of FIG. 14 may occur simultaneously. For example, in some embodiments, media data (e.g., audio data) may be streamed in stereo from the external device 155 to the node transceiver 120 via the I2S interface while the transceiver 127 sends SPI commands via the SPI interface to the external device 155 to read another media stream (e.g., an audio stream) from an SPI Flash device included in the external device 155 (e.g., to be played back at the master node 102).

Figure 15:
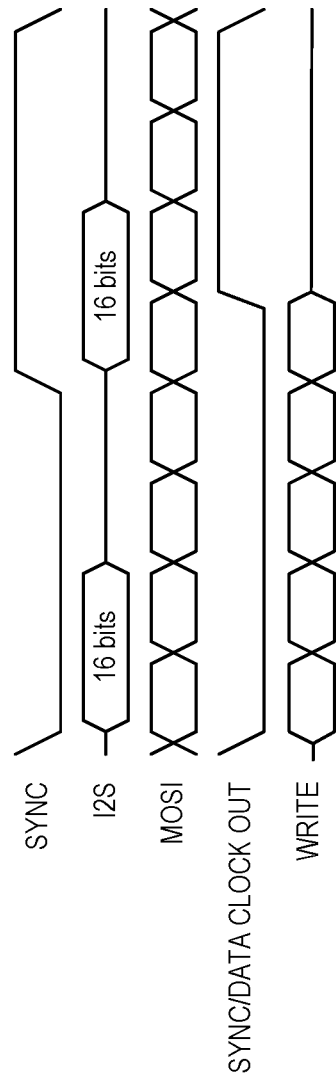
FIGS. 15 and 16 are diagrams of example communications that may take place in the arrangement of FIG. 14, in accordance with various embodiments.

FIG. 15 is a diagram of an example communication that may take place via the arrangement 165 of FIG. 14. In particular, FIG. 15 illustrates a 5-byte slave select to write 5 bytes of data via the SPI interface to a memory device (e.g., a Flash device) included in the external device 155, while 16 bits of data (e.g., tuner audio) is received by the transceiver 127 via the I2S interface. The data bit width (e.g., audio data bit width) could be more or less than 16 bits (e.g., 24 bits) and may be extended to more than two channels within a SYNC period if a TDM mode for more channels is used (e.g., TDM 4, TDM 8, TDM16, etc.).

Figure 16:
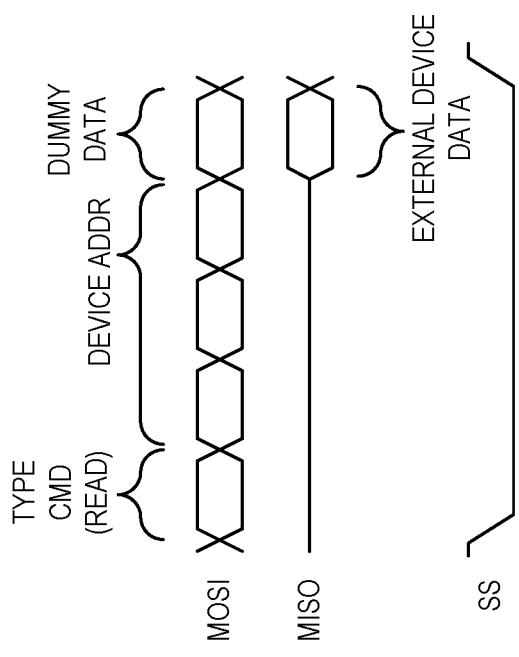

FIG. 16 is another diagram of an example communication that may take place via the arrangement 165 of FIG. 14 when the external device 155 includes a memory device (e.g., a Flash memory device). In particular, FIG. 16 illustrates a read/write type command (in this particular example, a "read" command), a device address (e.g., a memory address), and dummy data transmitted by the transceiver 127 over the MOSI line (used to clock the MISO pin of the external device 155). In response, the data stored in the external device 155 at the device address is transmitted back to the transceiver 127 over the MISO line.

Figure 17:
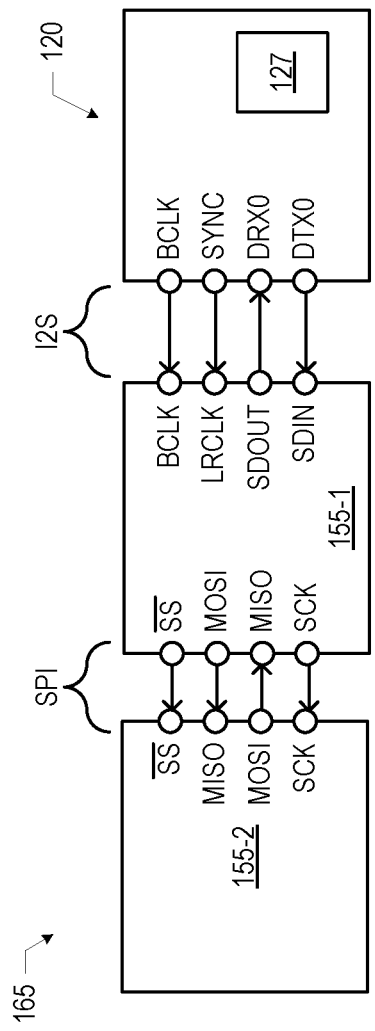
FIG. 17 is a block diagram of an example arrangement between a transceiver and multiple external devices, in accordance with various embodiments.

In some embodiments, an arrangement 165 between a node transceiver 120 and an external device 155 may include an intermediate device that assists in the communication between the node transceiver 120 and the external device 155. For example, FIG. 17 is a block diagram of an example arrangement 165 between a node transceiver 120, an external device 155-1, and an external device 155-2, in accordance with various embodiments. The external device 155-1 may be coupled between the node transceiver 120 and the external device 155-2. The arrangement 165 of FIG. 17 may be an example of the arrangement 165 of FIG. 2. Although the arrangement 165 of FIG. 14 illustrates an embodiment in which the transceiver 129 and the external device 155-2 communicate via the SPI protocol, in other embodiments, this communication may be conducted in accordance with other protocols (e.g., CAN, UART, or MIDI).

As discussed above with reference to FIG. 2, the node transceiver 120 may include a BCLK pin, a SYNC pin, a receive pin (DRX0), and a transmit pin (DTX0). A node transceiver 120 may include more than one receive pin and more than one transmit pin, in various embodiments. The external device 155-1 may include 2 sets of pins: a set of pins for I2S communication (including SCK, LRCLK, serial data in (SDIN), and serial data out (SDOUT)) and a set of pins for SPI communication (including SS, MOSI, MISO, and SCK). The external device 155-2 may include a set of pins for SPI communication (including SS, MOSI, MISO, and SCK). In some embodiments, the SS pins of the external devices 155 may instead be /SS pins. In some embodiments, as noted above, the external device 155-1 may provide multiple SS signals to individually select one of multiple external devices 155-2 via the SPI interface.

The transceiver 127 may communicate with the I2S pins of the external device 155-1 such that I2S communications may take place between the external device 155-1 and the node transceiver 120. particular, the BCLK pin of the node transceiver 120 may be coupled to the (I2S) SCK pin of the external device 155-1, the SYNC pin of the node transceiver 120 may be coupled to the LRCLK pin of the external device 155-1, the DRX0 pin of the node transceiver 120 may be coupled to the SDOUT pin of the external device 155-1, and the DTX0 pin of the node transceiver 120 may be coupled to the SDIN pin of the external device 155-1; the transceiver 127, and the external device 155-1, may control the electrical signals over these pins to communicate in accordance with the I2S protocol.

The SPI pins of the external device 155-1 may communicate with the SPI pins of the external device 155-2 such that SPI communications may take place between the external device 155-1 and the external device 155-2. The SCK pin of the external device 155-2 may be coupled to the (SPI) SCK pin of the external device 155-1, the SS pin of the external device 155-2 may be coupled to the SS pin of the external device 155-1, the MISO pin of the external device 155-2 may be coupled to the MOSI pin of the external device 155-1, and the MOSI pin of the external device 155-2 may be coupled to the MISO pin of the external device 155; the external devices 155-1 and 155-2 may control the electrical signals over these pins to communicate in accordance with the SPI protocol. In some embodiments, communications like those illustrated in FIG. 16 may be performed between the external device 155-1 and the external device 155-2.

The node transceiver 120 may communicate with the external device 155-2 (e.g., a memory device) via the intermediate external device 155-1. For example, the transceiver 127 may transmit data/commands to the external device 155-1, which may translate the data/commands and further transmit them to the external device 155-2; the node transceiver 120 may have received the data/commands from other nodes along the two-wire communication bus 106. The external device 155-2 may transmit data/commands to the external device 155-1, which may translate the data/commands as appropriate and further transmit them to the transceiver 127; the node transceiver 120 may provide the data/commands to other nodes along the two-wire communication bus 106.

SPI communication between the external device 155-1 and the external device 155-2 may be performed in accordance with any suitable SPI mode (e.g., mode 0, mode 1, mode 2, or mode 3). The SPI communication between the external device 155-1 and the external device 155-2 may be used to transmit data from the external device 155-2 to the external device 155-1, and then I2S communication between the external device 155-1 and the node transceiver 120 may be used to transmit data from the external device 155-1 to the node transceiver 120 (and, from there, to other nodes along the two-wire communication bus 106 in accordance with any of the techniques disclosed herein). Further, the I2S communication between the node transceiver 120 and the external device 155-1 may be used to transmit data from the node transceiver 120 (e.g., data received at the node transceiver 120 from another node along the two-wire communication bus in accordance with any of the techniques disclosed herein) to the external device 155-1, and then SPI communication between the external device 155-1 and the external device 155-2 may be used to transmit the data from the external device 155-1 to the external device 155-2. The external device 155-1 with which the transceiver 127 communicates may be any suitable device; for example, the external device 155 may include a microcontroller or another processing device.

Although FIG. 17 illustrates an I2S interface between the node transceiver 120 and the external device 155-1, this is only an example, and other protocols may be used to communicate between the node transceiver 120 and the external device 155-1. For example, a TDM protocol, or any compatible synchronous serial mode, may be used.

FIG. 18 illustrates a data frame that may be transmitted between the node transceiver 120 and the external device 155-1 in the arrangement of FIG. 17 when performing an I2S write operation. The data frame begins with a control word to describe the current payload to be converted to SPI, or converted from SPI and transmitted along the two-wire communication bus 106 in accordance with any of the techniques disclosed herein. A valid (V) bit may be set to indicate to the external device 155-1 that this communication describes a valid SPI transaction; if this bit is not set, the frame may be ignored. A raw/block mode (R) bit may be set to indicate whether SPI communications between the external device 155-1 and the external device 155-2 are to be performed in "raw" mode (in which individual SPI transactions are directly controlled) or "block" (or "table") mode (in which entire blocks of data may be transferred, perhaps periodically). If the R bit is set, then SPI communications may be performed in raw mode and the data included in the frame then directly controls the SPI transaction. Slave select (SS) bits control the state of the SPI slave select in raw mode; for example, the slave select may be low when these bits are "0 0," the slave select may not change when these bits are "1 1," and the slave select may be high when these bits are "0 1." Data count (DC) bits may indicate how many SPI bytes are contained in the frame of data (e.g., 2, 3, 4, 8, etc.). For example, the frame of data illustrated in FIG. 18 includes 3 data bytes. A capture read (CR) bit may indicate to the external device 155-1 to capture the SPI read-back from the external device 155-2 and send the data upstream to the node transceiver 120. If higher bandwidth is required or desired, a control word count/sync control method may be used.

FIG. 19 illustrates a set of seven data frames that may be sent from the transceiver 127 to the external device 155-1 over the I2S interface to instruct the external device 155-1 to read a byte of data from the external device 155-2 (e.g., a Flash memory device) over the SPI interface in raw mode. The frame structure illustrated in FIG. 19 may take the form of that illustrated in FIG. 18, but only a single byte of data may be included in each frame. The first frame instructs the external device 155-1 to set the SPI slave select line high. The second frame instructs the external device 155-1 to perform an SPI read command. The third frame provides the external device 155-1 with the high byte of the memory address that is to be read. The fourth frame provides the external device 155-1 with the middle byte of the memory address that is to be read. The fifth frame provide the external device 155-1 with the low byte of the memory address that is to be read. The sixth frame performs a "dummy" write operation. The seventh frame instructs the external device 155-1 to set the SPI slave select line low.

As noted above, communications in the arrangement 165 of FIG. 17 may be performed in a block mode. FIG. 20 illustrates a data frame that may be sent from the transceiver 127 to the external device 155-1 over the I2S interface to instruct the external device 155-1 to read data from the external device 155-2 (e.g., a Flash memory device) in blocks. The data frame may begin with a control word (e.g., as discussed above with reference to FIG. 18) with the raw/block (R) bit set to indicate block mode. The subsequent bytes may include a table address offset, a table data high address, and a table data low address.

FIG. 21 illustrates an alternate data frame that may be sent from the transceiver 127 to the external device 155-1 over the I2S interface to instruct the external device 155-1 to read data from the external device 155-2; in the embodiment of FIG. 21, the control word has a different structure than the structure illustrated in FIG. 18. In the embodiment of FIG. 21, the control word includes a valid (V) bit, a raw/table (R) bit, and data count (DC) bits, as discussed above with reference to FIG. 18. The control word of FIG. 21 also includes bits for a sync or table/data address. The subsequent data bytes indicate the high, medium, and low bytes of the memory address it is to be read. Blocks/tables of data of any suitable size may be read in this manner (e.g., 256 by 16 bit tables).

The arrangement 165 of FIG. 17 may include any suitable devices. For example, the node transceiver 120 may receive a command from the master node 102 via the two-wire communication bus 106 to start streaming mono or stereo audio data. The node transceiver 120 may respond by sending a read command to the external device 155-1 via the I2S interface, and the external device 155-1 may translate and relay this command to the external device 155-2 via the SPI interface. The external device 155-2 may provide the audio data to the external device 155-1 via the SPI interface, the external device 155-1 may provide the audio data to the node transceiver 120 via the I2S interface, and the node transceiver 120 may provide the audio data to the master node 102 via the two-wire communication bus 106 in accordance with any of the techniques disclosed herein. The master node 102 may later send a command to the node transceiver 120 to stop streaming, or streaming may end by utilizing a header communicated to the external device 155-2 (e.g., that indicates whether to loop playback or ended after its duration).

The following paragraphs provide examples of various ones of the embodiments disclosed herein.

Example 1 is an electronic device to interface between a two-wire communication bus and a non-native digital interface, including: a digital interface to support a first digital interface protocol; and a transceiver, coupled to the digital interface, to couple to a link of the two-wire communication bus and to receive data via the link, wherein the data includes commands in accordance with a second digital interface protocol different from the first digital interface protocol; wherein the digital interface is to transmit the commands to a peripheral device in accordance with the second digital interface protocol.

Example 2 includes the subject matter of Example 1, and further specifies that the received data is Manchester encoded.

Example 3 includes the subject matter of any of Examples 1-2, and further specifies that the first digital interface protocol is Inter-IC Sound (I2S).

Example 4 includes the subject matter of any of Examples 1-2, and further specifies that the first digital interface protocol is Time Division Multiplexing (TDM).

Example 5 includes the subject matter of any of Examples 1-2, and further specifies that the first digital interface protocol is Pulse Density Modulation (PDM).

Example 6 includes the subject matter of any of Examples 1-5, and further specifies that the second digital interface protocol is Serial Peripheral Interface (SPI).

Example 7 includes the subject matter of any of Examples 1-5, and further specifies that the second digital interface protocol is Controller Area Network (CAN).

Example 8 includes the subject matter of any of Examples 1-5, and further specifies that the second digital interface protocol is Universal Asynchronous Receiver Transmitter (UART).

Example 9 includes the subject matter of any of Examples 1-5, and further specifies that the second digital interface protocol is Musical Instrument Digital Interface (MIDI).

Example 10 includes the subject matter of any of Examples 1-9, and further specifies that the digital interface is to receive data from the peripheral device in accordance with the second digital interface protocol.

Example 11 includes the subject matter of Example 10, and further specifies that the peripheral device is to transmit the data to the digital interface in response to the commands.

Example 12 includes the subject matter of any of Examples 10, and further specifies that the peripheral device is a first peripheral device, and the digital interface is to receive data from a second peripheral device different from the first peripheral device.

Example 13 includes the subject matter of Example 12, and further specifies that the data received from the second peripheral device is in accordance with a third digital interface protocol different from the second digital interface protocol.

Example 14 includes the subject matter of Example 13, and further specifies that the third digital interface protocol is Inter-IC Sound (I2S).

Example 15 includes the subject matter of Example 14, and further specifies that the first digital interface protocol is Serial Peripheral Interface (SPI).

Example 16 includes the subject matter of any of Examples 12-15, and further specifies that the digital interface is to receive data from the first peripheral device simultaneously with receiving data from the second peripheral device.

Example 17 includes the subject matter of any of Examples 1-13, and further specifies that the transceiver is an upstream transceiver, the link is an upstream link, and the electronic device further includes a downstream transceiver to couple to a downstream link of the two-wire communication bus and to receive and transmit data via the downstream link.

Example 18 includes the subject matter of any of Examples 1-13, and further specifies that the transceiver is a downstream transceiver, the link is a downstream link, and the electronic device further includes an upstream transceiver to couple to an upstream link of the two-wire communication bus and to receive and transmit data via the downstream link.

Example 19 includes the subject matter of any of Examples 1-18, and further specifies that the transceiver is a first transceiver, the link is a first link, and the electronic device further includes a second transceiver to couple to a second link of the two-wire communication bus and to receive and transmit data via the second link.

Example 20 includes the subject matter of any of Examples 1-19, and further specifies that the digital interface includes a first processing device to translate the data received by the transceiver into a form compatible with the first digital interface protocol, and the digital interface includes a second processing device to translate the translated data into the form compatible with the second digital interface protocol.

Example 21 includes the subject matter of Example 20, and further specifies that the second processing device is included in a housing different from a housing of the transceiver.

Example 22 is a system for communicating via a digital interface over a two-wire communication bus, including: a master device including a transceiver to couple to a link of the two-wire communication bus and to receive and transmit data via the link; a slave device including a transceiver to couple to the link of the two-wire communication bus and to receive and transmit data via the link; the link of the two-wire communication bus; and a peripheral device, coupled to the slave device via a digital interface of the slave device, wherein the digital interface supports a first digital interface protocol, and the peripheral device communicates in accordance with a second digital interface protocol different from the first digital interface protocol; wherein data transmitted by the peripheral device in accordance with the second digital interface protocol is received at the digital interface of the slave device, and the slave device is to translate the data for transmission to the master device via the link of the two-wire communication bus.

Example 23 includes the subject matter of Example 22, and further specifies that the data transmitted over the link of the two-wire communication bus is Manchester encoded.

Example 24 includes the subject matter of any of Examples 22-23, and further specifies that the first digital interface protocol is Inter-IC Sound (I2S).

Example 25 includes the subject matter of any of Examples 22-23, and further specifies that the first digital interface protocol is Time Division Multiplexing (TDM).

Example 26 includes the subject matter of any of Examples 22-23, and further specifies that the first digital interface protocol is Pulse Density Modulation (PDM).

Example 27 includes the subject matter of any of Examples 22-26, and further specifies that the second digital interface protocol is Serial Peripheral Interface (SPI).

Example 28 includes the subject matter of any of Examples 22-26, and further specifies that the second digital interface protocol is Controller Area Network (CAN).

Example 29 includes the subject matter of any of Examples 22-26, and further specifies that the second digital interface protocol is Universal Asynchronous Receiver Transmitter (UART).

Example 30 includes the subject matter of any of Examples 22-26, and further specifies that the second digital interface protocol is Musical Instrument Digital Interface (MIDI).

Example 31 includes the subject matter of any of Examples 22-30, and further specifies that the peripheral device is a first peripheral device, the system further includes a second peripheral device different from the first peripheral device, and the digital interface is to receive data from the second peripheral device.

Example 32 includes the subject matter of Example 31, and further specifies that the data received from the second peripheral device is in accordance with a third digital interface protocol different from the second digital interface protocol.

Example 33 includes the subject matter of Example 32, and further specifies that the third digital interface protocol is Inter-IC Sound (I2S).

Example 34 includes the subject matter of Example 33, and further specifies that the first digital interface protocol is Serial Peripheral Interface (SPI).

Example 35 includes the subject matter of any of Examples 31-34, and further specifies that the digital interface is to receive data from the first peripheral device simultaneously with receiving data from the second peripheral device.

Example 36 includes the subject matter of any of Examples 22-35, and further specifies that the digital interface includes a first processing device to translate the data received by the transceiver into a form compatible with the first digital interface protocol, and the digital interface includes a second processing device to translate the translated data into the form compatible with the second digital interface protocol.

Example 37 includes the subject matter of Example 36, and further specifies that the second processing device is included in a housing different from a housing of the transceiver.

Example 38 includes the subject matter of any of Examples 22-37, and further specifies that the peripheral device includes a memory device.

Example 39 includes the subject matter of any of Examples 22-37, and further specifies that the peripheral device includes a Flash memory device.

Example 40 includes the subject matter of any of Examples 22-37, and further specifies that the peripheral device includes an audio source.

Example 41 includes the subject matter of any of Examples 22-40, and further specifies that the system is included in a vehicle.

Example 42 includes the subject matter of any of Examples 22-41, and further specifies that the master device is included in a head unit of a vehicle.

Example 43 is a method of communicating data in accordance with a digital interface protocol over a two-wire communication bus, including: receiving, at an electronic device over a link of a two-wire communication bus, data used for communication in accordance with a digital interface protocol, wherein the digital interface protocol includes Serial Peripheral Interface (SPI), Controller Area Network (CAN), Universal Asynchronous Receiver Transmitter (UART), or Musical Instrument Digital Interface (MIDI); and transmitting, by the electronic device over a digital interface to a peripheral device, at least some of the data in accordance with the digital interface protocol.

Example 44 includes the subject matter of Example 43, and further specifies that the digital interface protocol is a first digital interface protocol, and the digital interface supports a second digital interface protocol different from the first digital interface protocol.

Example 45 includes the subject matter of Example 44, and further specifies that the second digital interface protocol includes Inter-IC Sound (I2S), Time Division Multiplexing (TDM), or Pulse Density Modulation (PDM).

Example 46 includes the subject matter of any of Examples 43-45, and further specifies that the data used for communication in accordance with the digital interface protocol includes a command.

The invention claimed is:
1. Node circuitry for communication along a two-wire communication bus, comprising:
 a transceiver to couple to a link of the two-wire communication bus and to receive data via the link; and
 digital interface circuitry to support communication in accordance with a first digital interface protocol; wherein the data received via the link of the two-wire communication bus includes commands in accordance with a second digital interface protocol different from the first digital interface protocol, and the digital interface circuitry is communicatively coupled to the transceiver to transmit the commands to a peripheral device in accordance with the second digital interface protocol.

2. The node circuitry of claim 1, wherein the received data is Manchester encoded.

3. The node circuitry of claim 1, wherein the first digital interface protocol is Inter-IC Sound (I2S), Time Division Multiplexing (TDM), or Pulse Density Modulation (PDM).

4. The node circuitry of claim 1, wherein the second digital interface protocol is Serial Peripheral Interface (SPI), Controller Area Network (CAN), Universal Asynchronous Receiver Transmitter (UART), or Musical Instrument Digital Interface (MIDI).

5. The node circuitry of claim 1, wherein the digital interface circuitry is to receive data from the peripheral device in accordance with the second digital interface protocol.

6. The node circuitry of claim 1, wherein:
the transceiver is an upstream transceiver, the link is an upstream link, and the node circuitry further includes a downstream transceiver to couple to a downstream link of the two-wire communication bus and to receive and transmit data via the downstream link; or
the transceiver is a downstream transceiver, the link is a downstream link, and the node circuitry further includes an upstream transceiver to couple to an upstream link of the two-wire communication bus and to receive and transmit data via the downstream link.

7. The node circuitry of claim 1, wherein the digital interface circuitry includes a first processing device to translate the data received by the transceiver into a form compatible with the first digital interface protocol, and the digital interface circuitry includes a second processing device to translate the translated data into the form compatible with the second digital interface protocol.

8. The node circuitry of claim 5, wherein the peripheral device is a first peripheral device, and the digital interface circuitry is to receive data from a second peripheral device different from the first peripheral device.

9. The node circuitry of claim 8, wherein the data received from the second peripheral device is in accordance with a third digital interface protocol different from the second digital interface protocol.

10. The node circuitry of claim 8, wherein the digital interface circuitry is to receive data from the first peripheral device simultaneously with receiving data from the second peripheral device.

11. The node circuitry of claim 9, wherein the third digital interface protocol is Inter-IC Sound (I2S) and the first digital interface protocol is Serial Peripheral Interface (SPI).

12. A system for communicating via a digital interface over a two-wire communication bus, comprising:
a master device including a transceiver to couple to a link of the two-wire communication bus and to receive and transmit data via the link;
a slave device including a transceiver to couple to the link of the two-wire communication bus and to receive and transmit data via the link;
the link of the two-wire communication bus; and
a peripheral device, coupled to the slave device via a digital interface of the slave device, wherein the digital interface supports a first digital interface protocol, and the peripheral device communicates in accordance with a second digital interface protocol different from the first digital interface protocol; wherein data transmitted by the peripheral device in accordance with the second digital interface protocol is received at the digital interface of the slave device, and the slave device is to translate the data for transmission to the master device via the link of the two-wire communication bus.

13. The system of claim 12, wherein the first digital interface protocol is Inter-IC Sound (I2S), Time Division Multiplexing (TDM), or Pulse Density Modulation (PDM).

14. The system of claim 12, wherein the second digital interface protocol is Serial Peripheral Interface (SPI), Controller Area Network (CAN), Universal Asynchronous Receiver Transmitter (UART), or Musical Instrument Digital Interface (MIDI).

15. The system of claim 12, wherein the peripheral device includes a memory device or an audio source.

16. The system of claim 12, wherein the system is included in a vehicle.

17. The system of claim 12, wherein the master device is included in a head unit of a vehicle.

18. A method of communicating data in accordance with a non-native digital interface protocol over a two-wire communication bus, comprising:
receiving, at a node over a link of a two-wire communication bus, data for communication to a peripheral device in accordance with a first digital interface protocol, wherein the digital interface protocol includes Serial Peripheral Interface (SPI), Controller Area Network (CAN), Universal Asynchronous Receiver Transmitter (UART), or Musical Instrument Digital Interface (MIDI); and
transmitting, by the node via digital interface circuitry to the peripheral device, the data, wherein the digital interface circuitry supports a second digital interface protocol different from the first digital interface protocol.

19. The method of claim 18, wherein the second digital interface protocol includes Inter-IC Sound (I2S), Time Division Multiplexing (TDM), or Pulse Density Modulation (PDM).

20. The method of claim 18, wherein the node is a slave node of the two-wire communication bus.

* * * * *